United States Patent
Powers et al.

(10) Patent No.: US 10,263,329 B1
(45) Date of Patent: Apr. 16, 2019

(54) DYNAMIC AZIMUTH SCANNING FOR ROTATING ACTIVE ELECTRONIC SCANNED ARRAY RADAR

(71) Applicant: Raytheon Company, Waltham, MA (US)

(72) Inventors: Patrick J. Powers, Nashua, NH (US); Paul J. Lanzkron, Brighton, MA (US)

(73) Assignee: Raytheon Company, Waltham, MA (US)

( * ) Notice: Subject to any disclaimer, the term of this patent is extended or adjusted under 35 U.S.C. 154(b) by 473 days.

(21) Appl. No.: 14/594,221

(22) Filed: Jan. 12, 2015

(51) Int. Cl.
*H01Q 3/26* (2006.01)

(52) U.S. Cl.
CPC ..................... *H01Q 3/26* (2013.01)

(58) Field of Classification Search
CPC ........... G01S 2013/0254; G01S 13/424; G01S 7/2925; G01S 7/032; G01S 13/24; G01S 13/4418; G01S 13/426; G01S 7/36; G01S 13/0272; G01S 3/46; G01S 13/726; G01S 7/02; G01S 1/02; H04W 4/026; G01C 11/025; F41G 7/2213; H01Q 3/02; H01Q 3/08; H01Q 3/10; H01Q 3/12; H01Q 3/14; H01Q 3/16; H01Q 3/18; H01Q 3/20; H01Q 3/04; H01Q 3/005; H01Q 3/32;
(Continued)

(56) References Cited

U.S. PATENT DOCUMENTS 3,906,502 A * 9/1975 Connolly ................. H01Q 3/34
342/372
4,649,390 A 3/1987 Andrews et al.
(Continued)

FOREIGN PATENT DOCUMENTS

CN 101765789 A 6/2010
EP 0 741 307 A2 11/1996
(Continued)

OTHER PUBLICATIONS

Taiwan IPO Search Report with English Translations for Taiwan Application No. 105100691 dated Oct. 22, 2016; 2 Pages.
Taiwan Office Action with English Translations for Taiwan Application No. 105100691 dated Oct. 26, 2016; 10 Pages.
PCT International Search Report and Written Opinion dated Mar. 24, 2016 corresponding to International Application No. PCT/US2016/012821; 16 Pages.
PCT International Preliminary Report and Written Opinion dated Jul. 18, 2017 for International Application No. PCT/US2016/012821; 11 Pages.
(Continued)

*Primary Examiner* — Bernarr E Gregory
*Assistant Examiner* — Daniel P Malley, Sr.
(74) *Attorney, Agent, or Firm* — Daly, Crowley, Mofford & Durkee, LLP

(57) ABSTRACT

Embodiments for providing dynamic azimuth scanning are generally described herein. In some embodiments, weather survey measurements are performed to estimate environmental losses as a function of azimuth angles. Gain improvements are determined based on the amount of energy increase used at different azimuth angles derived from the azimuth loss survey measurements. A gain profile is generated based on the determined gain improvements. An azimuth offset profile is derived using the gain profile to define azimuth angles where progressive scan back is used in the area of environmental losses to provide additional power and to define azimuth angles where progressive scan forward is used in regions of low loss. Dynamic electronic azimuth beam steering provides a near-constant average target detection range as a function of azimuth in the presence of non-uniform loss.

15 Claims, 19 Drawing Sheets

(58) Field of Classification Search
CPC ............ H01Q 1/18; H01Q 1/24; H01Q 1/125; H01Q 1/246; H01Q 1/1257; H01Q 19/191; H01Q 13/02; H01Q 25/04
USPC ........................................................ 342/372
See application file for complete search history.

(56) References Cited

U.S. PATENT DOCUMENTS

| | | | | |
|---|---|---|---|---|
| 4,675,678 | A * | 6/1987 | Klingenschmitt | G01S 13/24 342/131 |
| 4,814,779 | A * | 3/1989 | Levine | H01Q 3/14 342/375 |
| 5,066,956 | A | 11/1991 | Martin | |
| 5,173,706 | A * | 12/1992 | Urkowitz | G01S 7/032 342/101 |
| 5,825,322 | A * | 10/1998 | Capozoli | G01S 13/762 342/37 |
| 5,923,302 | A * | 7/1999 | Waterman | H01Q 1/28 343/727 |
| 6,147,643 | A * | 11/2000 | Aubry | H01Q 3/26 342/174 |
| 6,308,043 | B1 * | 10/2001 | Solheim | H04B 17/3913 342/351 |
| 6,400,315 | B1 * | 6/2002 | Adler | H01Q 1/125 342/359 |
| 6,741,203 | B1 * | 5/2004 | Woodell | G01S 5/02 342/120 |
| 9,081,092 | B1 * | 7/2015 | Friesel | G01S 13/726 |
| 2002/0168974 | A1 * | 11/2002 | Rosen | H04B 7/18513 455/429 |
| 2006/0276985 | A1 * | 12/2006 | Xu | G01C 11/025 702/81 |
| 2007/0018882 | A1 * | 1/2007 | Manoogian | G01S 13/4418 342/80 |
| 2010/0156700 | A1 * | 6/2010 | Barbaresco | G01S 7/36 342/81 |
| 2010/0259312 | A1 | 10/2010 | Menon et al. | |
| 2014/0302869 | A1 * | 10/2014 | Rosenbaum | H04W 4/026 455/456.1 |
| 2015/0061916 | A1 * | 3/2015 | Sinclair | G01S 13/426 342/41 |
| 2016/0007315 | A1 * | 1/2016 | Lundgreen | G01S 3/46 455/67.11 |

FOREIGN PATENT DOCUMENTS

| | | | |
|---|---|---|---|
| FR | 2 875 013 | 3/2006 | |
| GB | 2 500 931 A | 10/2013 | |
| JP | 02-045783 | 2/1990 | |
| JP | 2004-212285 | 7/2004 | |
| JP | 2009-002921 | 1/2009 | |
| TW | 201151892 A | 9/2011 | |
| TW | 201218511 A | 5/2012 | |
| WO | WO 2005116687 A1 * | 12/2005 | ............... G01S 7/02 |

OTHER PUBLICATIONS

Taiwanese Notice of Allowance (with English Translation) dated Feb. 18, 2017 for Taiwan Application No. 105100691; 4 Pages.
EPO Communication Pursuant to Rules 161(1) and 162 EPC dated Sep. 1, 2017; for European Pat. App. No. 16701704.5; 2 pages.
Response with Amended Claims and Specification in English to Taiwan Office Action dated Nov. 15, 2016 for Taiwan Application No. 105100691; Response filed Jan. 23, 2017; 12 Pages.
Response (with Claims) to European 161/162 Communication dated Sep. 1, 2017 for European Application No. 16701704.5; Response filed Feb. 15, 2018; 20 Pages.
Japanese Office Action (with English Translation) dated May 29, 2018 for Japanese Application No. 2017-536822; 7 Pages.
Response (with English Translation and Amended Claims) to Japanese Office Action dated May 29, 2018 for Japanese Application No. 2017-536822; Response filed on Jul. 31, 2018; 17 Pages.
Japanese Notice of Allowance (with Allowed Claims in English) dated Sep. 4, 2018 for Japanese Application No. 2017-536822; 10 Pages.

* cited by examiner

DYNAMIC AZIMUTH SCANNING FOR ROTATING ACTIVE ELECTRONIC SCANNED ARRAY RADAR

BACKGROUND

Rotating three dimensional surveillance radars normally use a template or fan of search beams which cover the elevation extent of the surveillance volume and are steered to the mechanical azimuth of the antenna. This approach provides a uniform distribution of radar energy and probability of detection as a function of azimuth when presented with azimuthally symmetric environmental conditions. If however, the environmental conditions are not azimuthally symmetric, such as in the presence of locally strong clutter or weather conditions at particular azimuth angles, then this scanning approach results in locally reduced probability of detection and target range at those angles. Rain interference in the microwave region can be of such intensity that the tracking of an aircraft, or for that matter any object, becomes difficult, if not impossible.

To compensate for these types of conditions, low frequency bands have been used because precipitation and cloud losses are significantly lower with lower frequency (e.g. Ultra High Frequency (UHF), Very High Frequency (VHF), L band, S band). However, the amount of energy spent per unit azimuth in a rotating three dimensional (3D) surveillance radars is normally limited by the rotation rate, e.g., for a 12 RPM antenna, 13.8 milliseconds of radar resources are available for each 1 degree of azimuth during rotation.

If a heavy rain cell exists in an isolated azimuth region, the target SNR decreases and reduces the probability of detection (Pd) at that azimuth. Assuming a duty constraint, simply using a higher energy template to counter the extra loss is not effective. More energy increases template duration and thus azimuth spacing. However, increased azimuth spacing increases beamshape loss and increased beamshape loss counteracts the increased energy applied. The result is that target detection range decreases significantly at the azimuth angles with the storm cell while remaining high elsewhere.

Existing rotating 3D surveillance radar designs use a static azimuth scan angle off broadside and electronically scan in elevation. Other optional radar design tradeoffs may consider reduction of search elevation extent to allow more energy per steradian per unit of time at azimuth angles where degraded conditions exist. Further, designing system sensitivity for worst case storm azimuth results it excess margin elsewhere, i.e., increases cost. In addition, limiting the maximum elevation in heavy rain so that more energy can be scheduled at low elevations cuts the search volume.

SUMMARY

In one aspect of the invention, an active electronically scanning array comprises: a plurality of radiating elements, a radiating element including a transmit-receive module for providing transmitter and receiver functions for each radiating element; and a controller, coupled to the plurality of transmit-receive modules, the controller arranged to provide dynamic electronic azimuth beam steering to vary a net azimuth beam scan rate with progressive scan back rotation at azimuths where dwell time is increased and with progressive scan forward rotation where reduced dwell time is used to maintain a substantially constant average target detection range as a function of azimuth in a presence of non-uniform loss.

The array can further include one or more of the following features: the dynamic electronic azimuth beam steering provides a rate of forward scan or back scan at azimuth angles identified according to an azimuth offset profile, the rate of forward scan or back scan at azimuth angles identified according to the azimuth offset profile controls an amount of time spent transmitting within any given azimuth region and allows non-uniform distribution of radar energy as a function of azimuth to provide more uniform probability of detection (Pd) in presence of non-uniform weather loss conditions, the controller uses templates having durations that achieve a pre-set azimuth spacing of search beams based on a mechanical rate and the azimuth offset profile, the controller uses a single template for all 360 degrees azimuth, wherein an azimuth spacing increases and decreases proportional to the rate of forward and back scanning, the controller uses multiple templates, the controller uses the multiple templates by using, during the progressive forward scan, a progressive forward scan template having a broader spacing than a normal template and using, during a progressive backward scan, a higher energy template having normal spacing, the controller uses, in the progressive forward scan, a broader spacing than a normal scan and uses, in the progressive backward scan, a tighter spacing with more beam overlap, and/or the azimuth offset profile corresponds to operator-defined gain characteristics.

In another aspect of the invention, a method for providing dynamic azimuth scanning, comprises: determining gain improvements based on an amount of energy of a radar beam from an antenna array that is used at different azimuth angles of a 360° mechanical rotation derived from azimuth loss information; generating a gain profile based on the determined gain improvements to identify gain to be applied at azimuth angles; and deriving an azimuth offset profile using the gain profile, wherein the azimuth offset profile defines azimuth angles where progressive scan back is used in an area of environmental losses to provide additional power to compensate for loss and defines azimuth angles where progressive scan forward is used in regions of low loss.

The method can further include one or more of the following features: providing dynamic electronic azimuth beam steering to vary a net azimuth beam scan rate with progressive scan back at azimuths where extra dwell time is used and with progressive scan forward where reduced dwell time is allowed to maintain a substantially constant average target detection range as a function of azimuth in a presence of non-uniform loss, deriving an azimuth offset profile further comprises: generating an initial azimuth offset profile; scaling the initial azimuth offset profile to ensure that a net electronic scan for a full rotation period of a radar is substantially zero by summing an amount of electronic scan in each sector and then applying a linear correction to the electronic scan in each sector to remove slope; biasing the scaled azimuth offset profile to ensure that the electronic scan is relative to a nominal electronic surveillance scan angle off azimuth broadside by subtracting a mean azimuth scan offset and adding the nominal surveillance azimuth angle; and scaling the biased azimuth offset profile such that a maximum cumulative electronic offset is capped at a predetermined value, mapping the scaled, biased azimuth offset profile into a function of mechanical broadside azimuth angle for use in a radar scheduler as the radar rotates, providing dynamic electronic azimuth beam steering further comprises using a single template for all 360 degrees azimuth, the azimuth spacing increases and decreases proportional to a rate of forward and back scanning, providing dynamic electronic azimuth beam steering further comprises using, in the progressive forward scan, a broader spacing than a normal scan and using, in the progressive backward scan, a tighter spacing with more beam overlap, providing dynamic electronic azimuth beam steering further comprises using multiple templates, using multiple templates further comprises using, during the progressive forward scan, a progressive forward scan template having a broader spacing than a normal template and using, during a progressive backward scan, a higher energy template having normal spacing, the providing dynamic electronic azimuth beam steering further comprises dynamic scanning providing a near-uniform target range performance in a presence of non-uniform loss, wherein loss in a storm area is compensated for by using power that would have been used in a clear weather area, and/or determining gain improvements based on an amount of energy of a radar beam that is used at different azimuth angles of a 360° mechanical rotation derived from azimuth loss survey measurements comprises using weather survey measurements to estimate environmental losses as a function of azimuth angles by using a dedicated weather survey dwell template to detect and categorize rain at each azimuth angle.

In a further aspect of the invention, at least one non-transitory machine readable medium comprises instructions that, when executed by the machine, cause the machine to perform operations for: determining gain improvements based on an amount of energy increase of a radar beam that is used at different azimuth angles of a 360° mechanical rotation derived from azimuth loss information; generating a gain profile based on the determined gain improvements to identify gain to be applied at each azimuth angle; deriving an azimuth offset profile using the gain profile, wherein the azimuth offset profile defines azimuth angles where progressive scan back is used in an area of environmental losses to provide additional power to compensate for loss and defines azimuth angles where progressive scan forward is used in regions of low loss to allow the radar beam to catchup; and providing dynamic electronic azimuth beam steering to vary a net azimuth beam scan rate with progressive scan back at azimuths where extra dwell time is used and with progressive scan forward where reduced dwell time is allowed to maintain a near-constant average target detection range as a function of azimuth in a presence of non-uniform loss.

The machine readable medium can further include instructions for one or more of the following features: deriving an azimuth offset profile further comprises: generating an initial azimuth offset profile; scaling the initial azimuth offset profile to ensure that a net electronic scan for a full rotation period of a radar is substantially zero by summing an amount of electronic scan in each sector and then applying a linear correction to the electronic scan in each sector to remove slope; biasing the scaled azimuth offset profile to ensure that the electronic scan is relative to a nominal electronic surveillance scan angle off azimuth broadside by subtracting a mean azimuth scan offset and adding the nominal surveillance azimuth angle; and scaling the biased azimuth offset profile such that a maximum cumulative electronic offset is capped at a predetermined value, mapping the scaled, biased azimuth offset profile into a function of mechanical broadside azimuth angle for use in a radar scheduler as the radar rotates, providing dynamic electronic azimuth beam steering further comprises using a single template for all 360 degrees azimuth, the azimuth spacing increases and decreases proportional to a rate of forward and back scanning, providing dynamic electronic azimuth beam steering further comprises using, in the progressive forward scan, a broader spacing than a normal scan and using, in the progressive backward scan, a tighter spacing with more beam overlap, providing dynamic electronic azimuth beam steering further comprises using multiple templates, using multiple templates further comprises using, during the progressive forward scan, a progressive forward scan template having a broader spacing than a normal template and using, during a progressive backward scan, a higher energy template having normal spacing, the providing dynamic electronic azimuth beam steering further comprises dynamic scanning providing a near-uniform target range performance in a presence of non-uniform loss, wherein loss in a storm area is compensated for by using power that would have been used in a clear weather area, and/or determining gain improvements based on an amount of energy of a radar beam that is used at different azimuth angles of a 360° mechanical rotation derived from azimuth loss survey measurements comprises using weather survey measurements to estimate environmental losses as a function of azimuth angles by using a dedicated weather survey dwell template to detect and categorize rain at each azimuth angle.

DETAILED DESCRIPTION

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

According to an embodiment, an electronic azimuth beam steering is determined that will vary the net azimuth beam scan rate (sum of mechanical plus electronic) with slow down at azimuths where extra dwell time is used, e.g., to compensate for heavy rain loss, and speed up where reduced dwell time is allowed, e.g., by available margin in light rain sectors. Rain loss is determined by processing extended target detections from weather survey dwells. Thus, an electronic azimuth scanning strategy is provided for rotating active electronically steered phased array surveillance radars to compensate for locally increased azimuth regions of loss. The electronic azimuth scanning strategy according to an embodiment includes estimating environmental losses and generating an azimuth offset profile. The environmental losses that are estimated may include losses from rain. Azimuth loss survey measurements, e.g., weather survey measurements, may be used to estimate these losses as a function of azimuth. The azimuth offset profile is used to set the amount of forward or back scan relative to mechanical azimuth broadside as a function of broadside azimuth angle. A template or fan of search beams is defined in elevation which covers the surveillance volume elevation extent. The azimuth angle is electronically scanned relative to the mechanical array broadside angle while rotating using the azimuth angles in the offset profile. The rate of forward scan or back scan allows control of the amount of time spent transmitting within any given azimuth region and allows non-uniform distribution of radar energy as a function of azimuth to provide more uniform probability of detection (Pd) in presence of non-uniform weather loss conditions.

The electronic azimuth scanning strategy according to an embodiment enables higher frequency band radars, e.g., C-band, to be used in long-range surveillance missions by overcoming losses due to rain. Using a higher frequency band means higher quality data and more capability for the warfighter, better accuracy to support fire control missions, better angular resolution and wider bandwidths supported at C band, X band, etc. for discrimination and electronic protection. Templates are developed with a duration that achieves a pre-set azimuth spacing of the search beams based on the mechanical rate (e.g. to space at 3 dB Az beamwidth).

Figure 1:
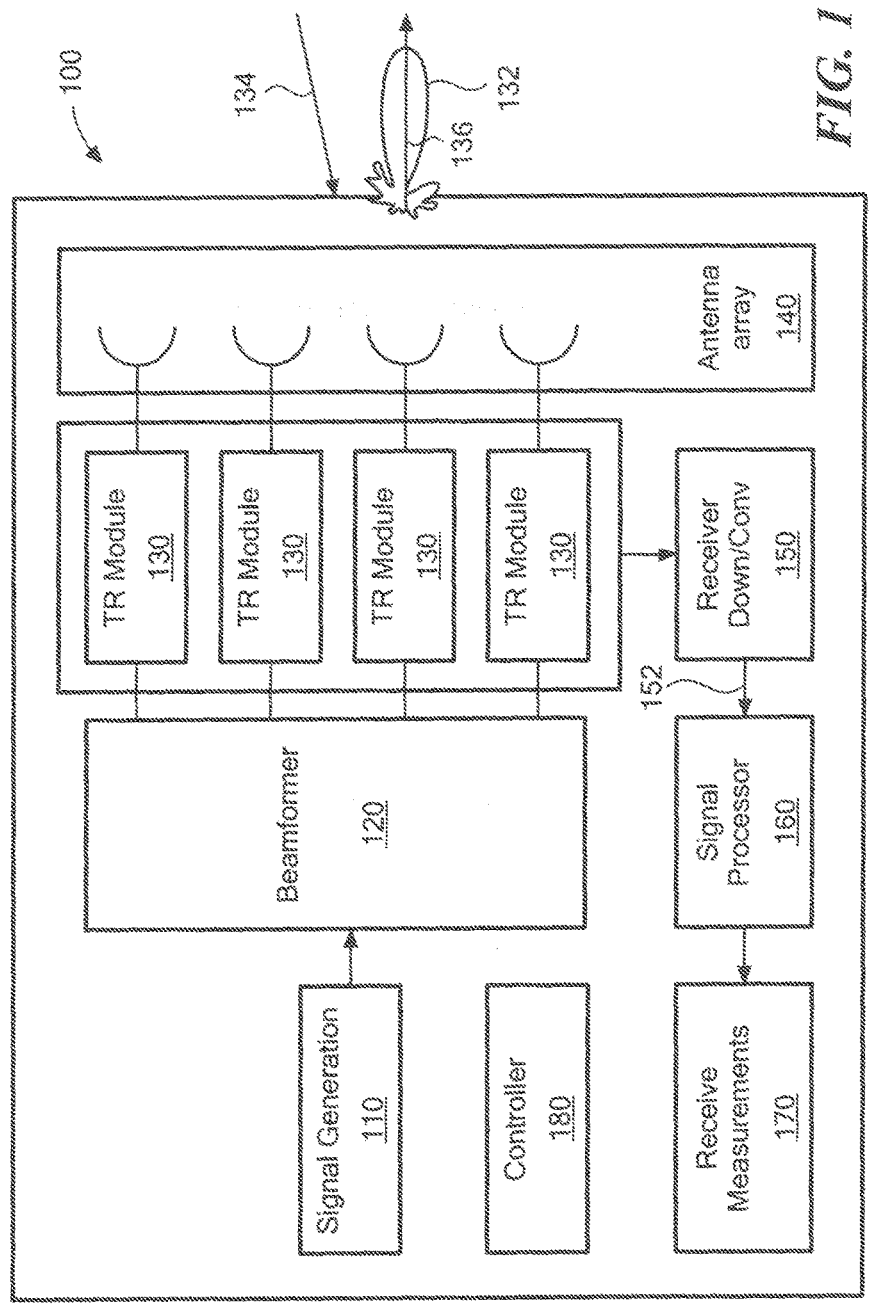
FIG. 1 illustrates an active electronically scanned array (AESA) radar system according to an embodiment.

FIG. 1 illustrates an active electronically scanned array (AESA) radar system 100 according to an embodiment. In FIG. 1, the AESA radar system 100 includes a signal generation module 110, a beamformer 120, transmit/receive (TR) modules 130 and the antenna array 140. The TR modules 130 provide the signal strength and the duration of the transmitted signal 132 emitted by the antenna array 140. FIG. 1 shows the mechanical boresight 136 when the antenna array 140 is radiating the transmitted signal 132 without beam steering. For most antennas the boresight is the axis of symmetry of the antenna. However active electronically scanned array (AESA) radar system 100 can electronically steer the beam, changing the angle of a steered radar beam relative to the plane of the antenna array 140. Received signals 134 are provided to a receiver 150 that downconverts the frequency of the received signals 134 for signal processing. A signal processor 160 generates received measurements 170 from the downconverted received signals 152. For example, the signal processor 160 may processes the downconverted received signals 152 using known processing methods to extract the position, velocity, direction of motion, and the type of target. A controller 180 may be provided to control the transmit and receive functions of the AESA radar system 100.

Figure 2:
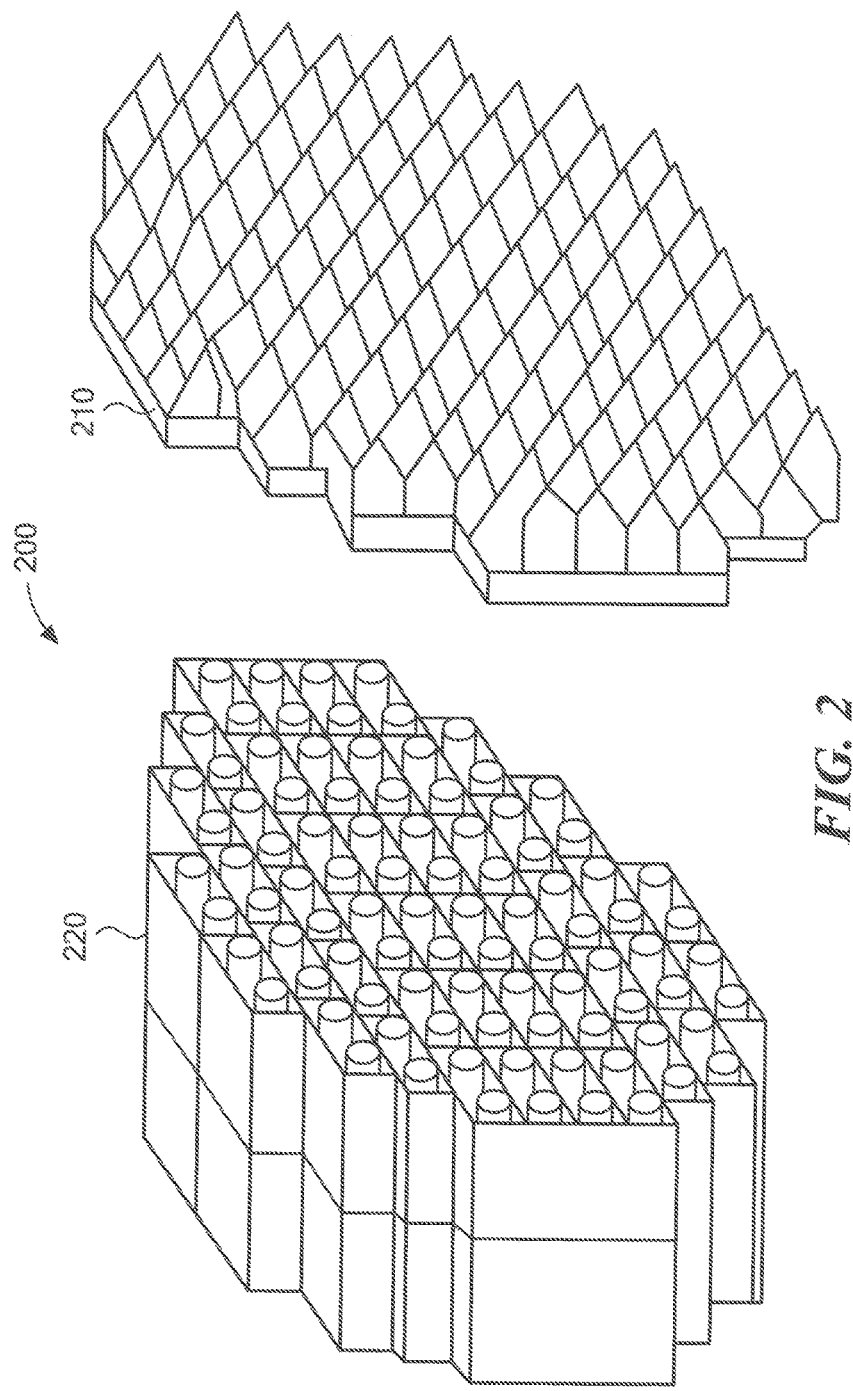
FIG. 2 illustrates an active electronically scanned array (AESA) according to an embodiment.

FIG. 2 illustrates an active electronically scanned array (AESA) 200 according to an embodiment. The AESA 200 is mounted to a 360 degree rotating pedestal (not shown in FIG. 2). An active electronically scanned array (AESA) antenna 200 is an antenna including multiple radiators 210. The relative amplitude and phase of each of the radiators 210 can be controlled so that transmit or receive beams can be electronically steered without the using a physically or mechanically moving antenna. Such an antenna includes an aperture for transmitting or receiving waves traveling in free space and may include back-end circuitry having electronics modules 220 for generating signals to be transmitted and for processing received signals.

Figure 3A:
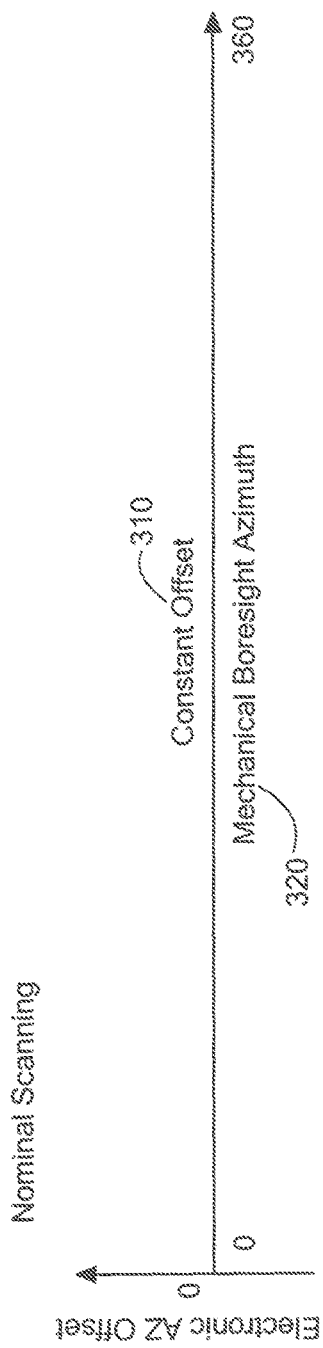
FIGS. 3a-b provide a comparison between nominal scanning and dynamic scanning according to an embodiment.
Figure 3B:
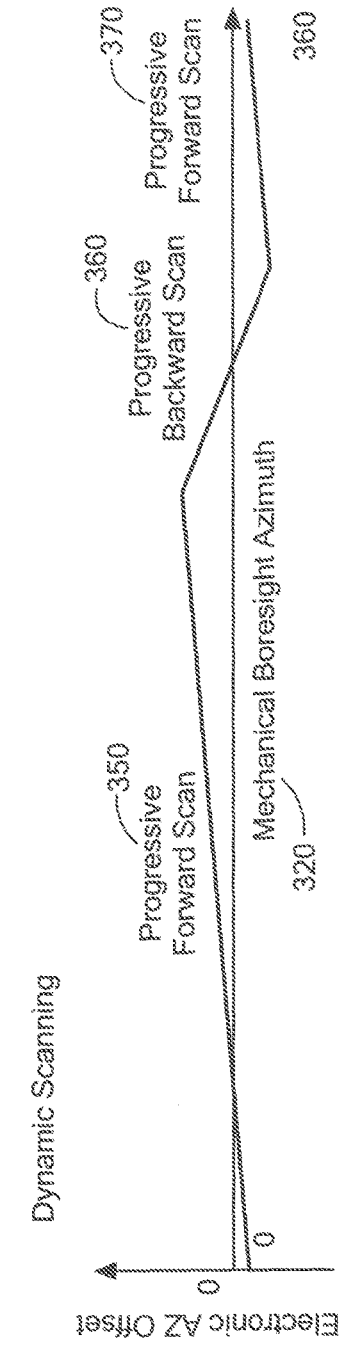

FIGS. 3a-b provides a comparison between nominal scanning and dynamic scanning according to an embodiment. FIG. 3a shows a constant offset 310, e.g., 0 degrees, from the mechanical boresight azimuth 320. FIG. 3b shows dynamic scanning where the azimuth offset is modified during rotation. In FIG. 3b, a progressive forward scan 350 is provided from 0° to about 240°. A progressive backward scan 360 is provided from about 240° to about 300°. Then, from about 300° to 360° a progressive forward scan 370 is again applied.

Figure 4:
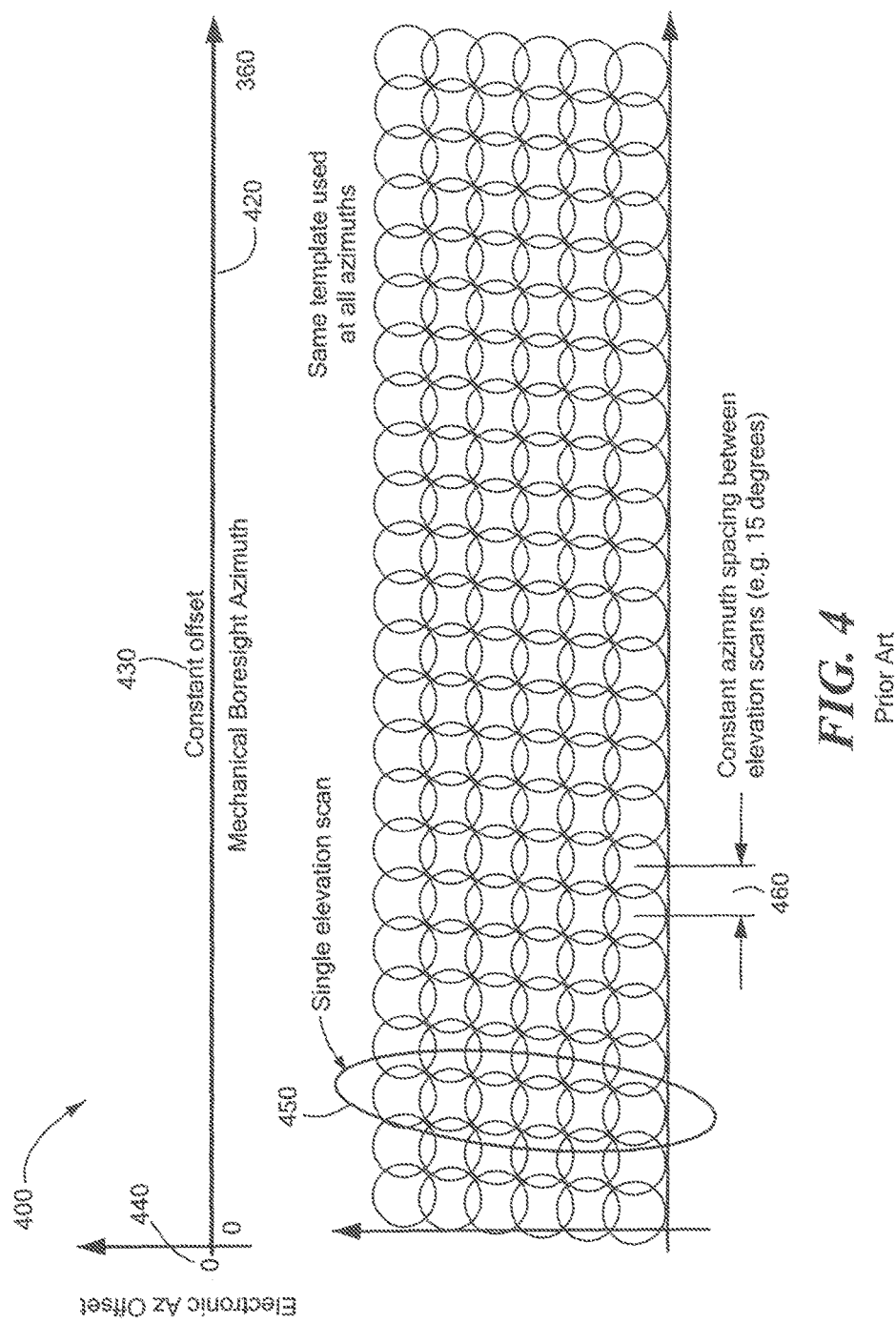
FIG. 4 illustrates a prior art scanning using a single template.

Nominally without dynamic scan, beam azimuth spacing is equal to the template duration multiplied by the mechanical rotation rate. With dynamic scan, if a single template is used for all 360 degrees azimuth, the azimuth spacing increases or decreases proportional to the rate of forward/back scanning. Tighter azimuth spacing means more overlap and higher cumulative probability of detection. With dynamic scan, if the rate of back scan is above a specified threshold, the template may be switched out for a higher energy template to put out more power. However, higher energy waveforms take more time whereas dynamic scan allows more time to be spent per unit azimuth than nominal operations. Azimuth spacing with the high energy template is similar to nominal azimuth spacing without dynamic scan. FIG. 4 illustrates a prior art scanning using a single template 400. In FIG. 4, the normal scanning using a single template 400 provides a fixed electronic azimuth angle and same elevation scan template at all angles 420. The normal scanning using a single template 400 provides a constant offset 430, e.g., 0 degrees, from the mechanical boresight azimuth 440. A single column 450 represents a single elevation scan. The same template is used at all azimuths. Moreover, a constant azimuth spacing 460 is provided between each of the elevation scans, e.g., 15 degrees.

Figure 5:
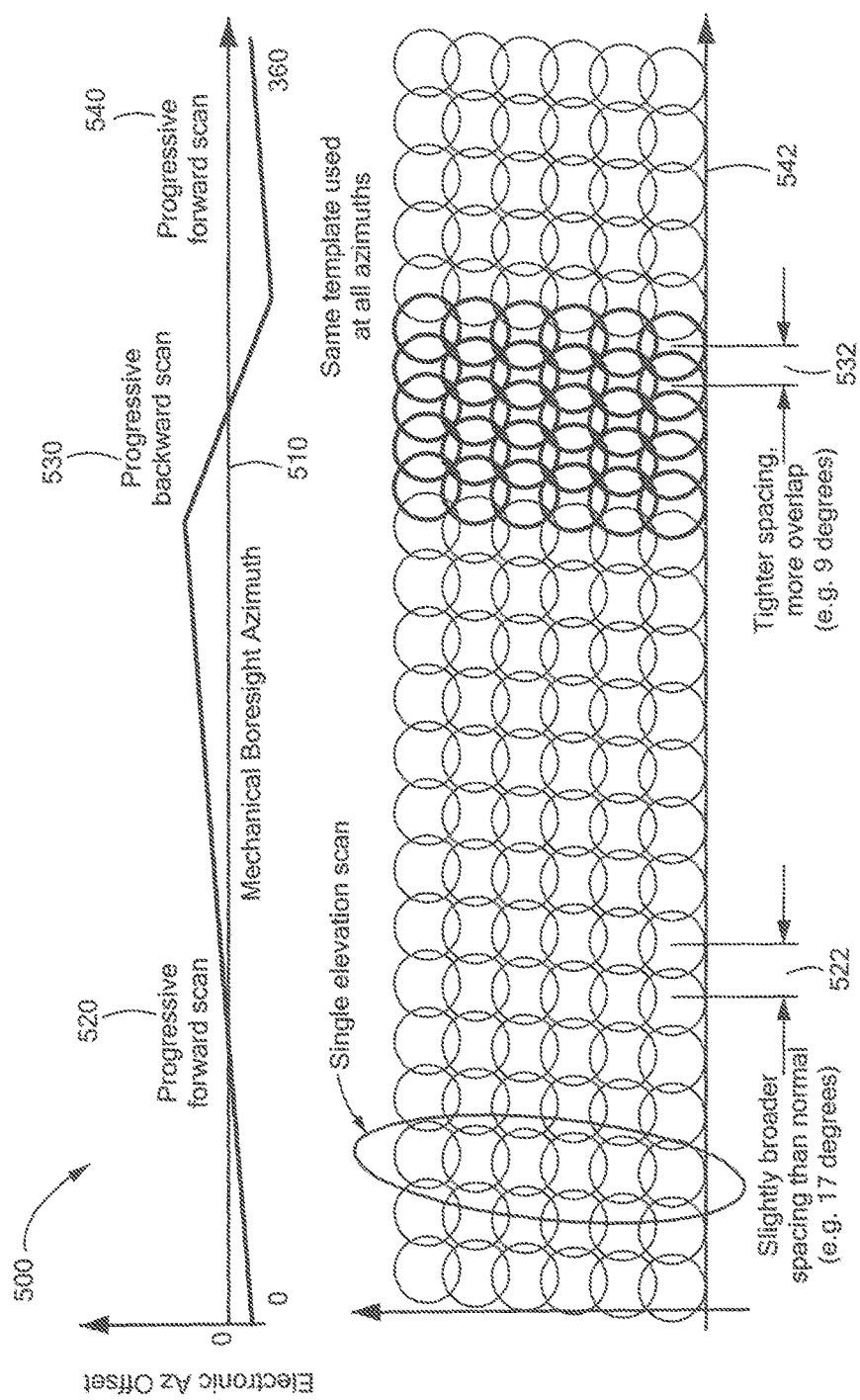
FIG. 5 illustrates a dynamic scanning using a single template according to an embodiment.

FIG. 5 illustrates a dynamic scanning using a single template 500 according to an embodiment. In FIG. 5, the same elevation scan template 510 is used at all angles. However, during the progressive forward scan 520, a slightly broader spacing than normal 522 is provided. During the progressive backward scan 530, a tighter spacing with more overlap 532 is used. Then, the spacing is changed to the slightly broader spacing 542 again for the progressive forward scan 540.

Figure 6:
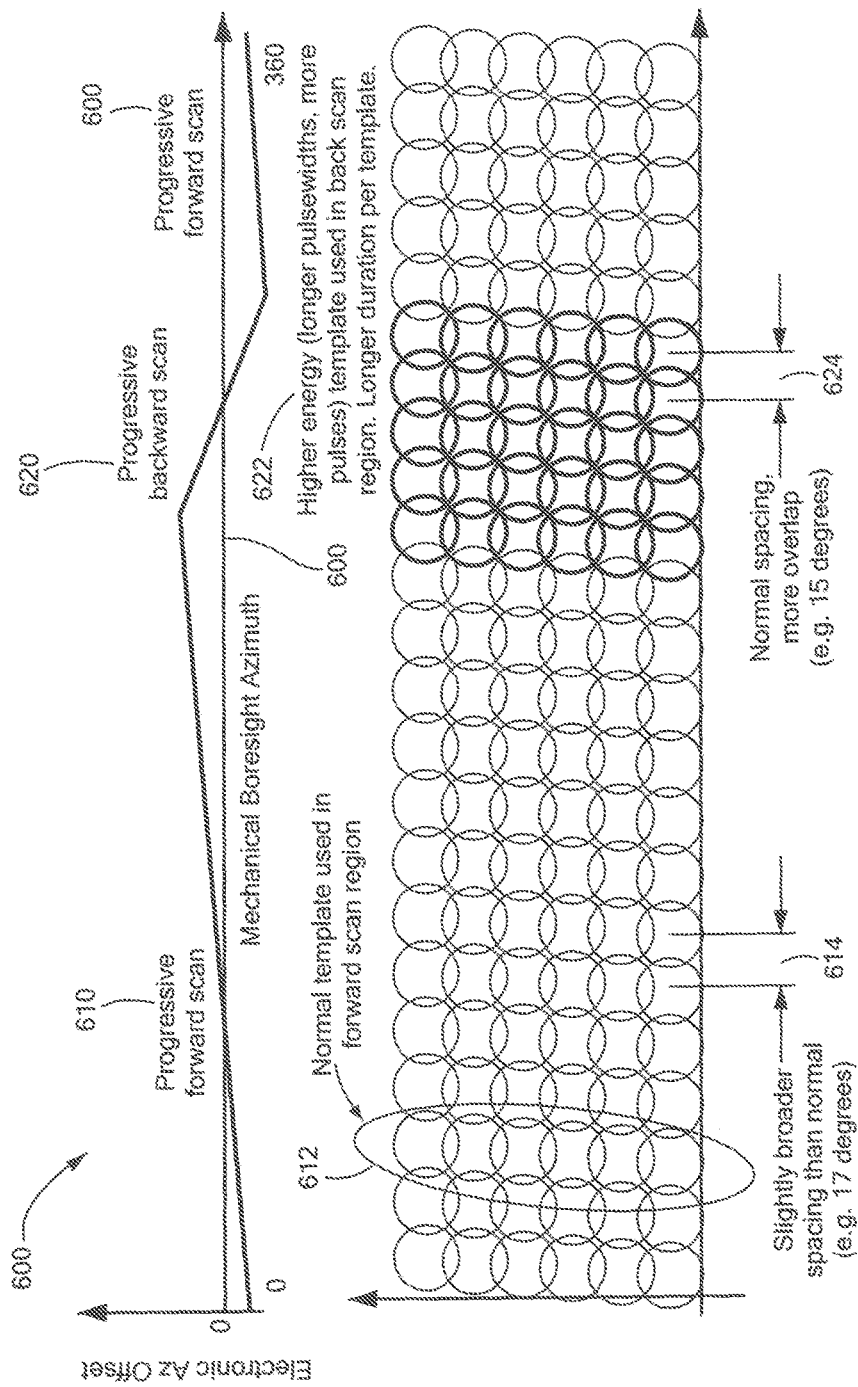
FIG. 6 illustrates dynamic scanning using multiple templates according to an embodiment.

FIG. 6 illustrates dynamic scanning using multiple templates 600 according to an embodiment. During the progressive forward scan 610, a first template is used, e.g., a normal template 612. The normal template 612 for the progressive forward scan has a slightly broader spacing 614 than the normal template shown in FIGS. 4-5. During the progressive backward scan 620, a higher energy template 622 is used which has normal spacing 624. The higher energy template 622 may provide longer pulse widths and more pulses for a longer duration per template.

Figure 7A:
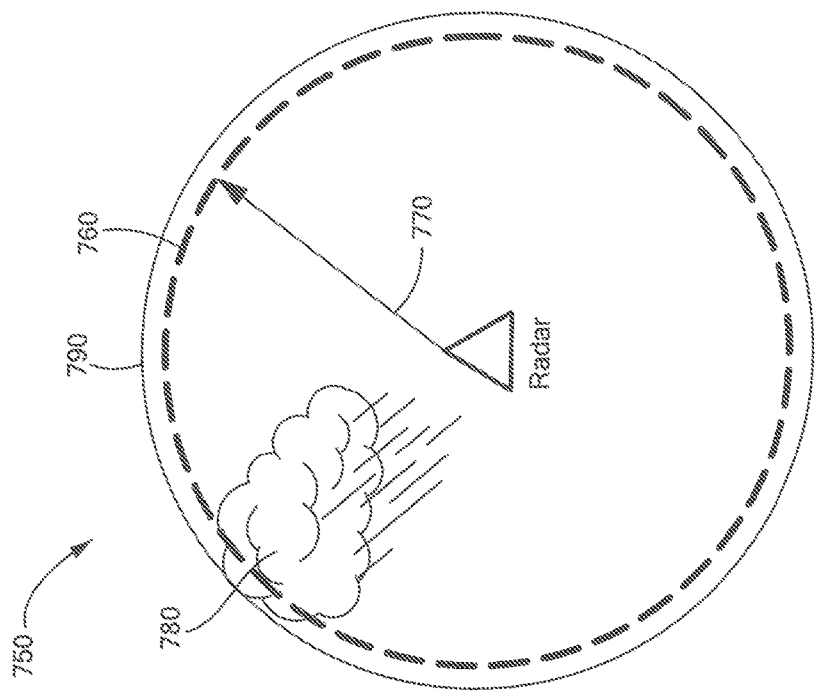
FIGS. 7a-b illustrate the benefit of dynamic azimuth scanning according to an embodiment.
Figure 7B:
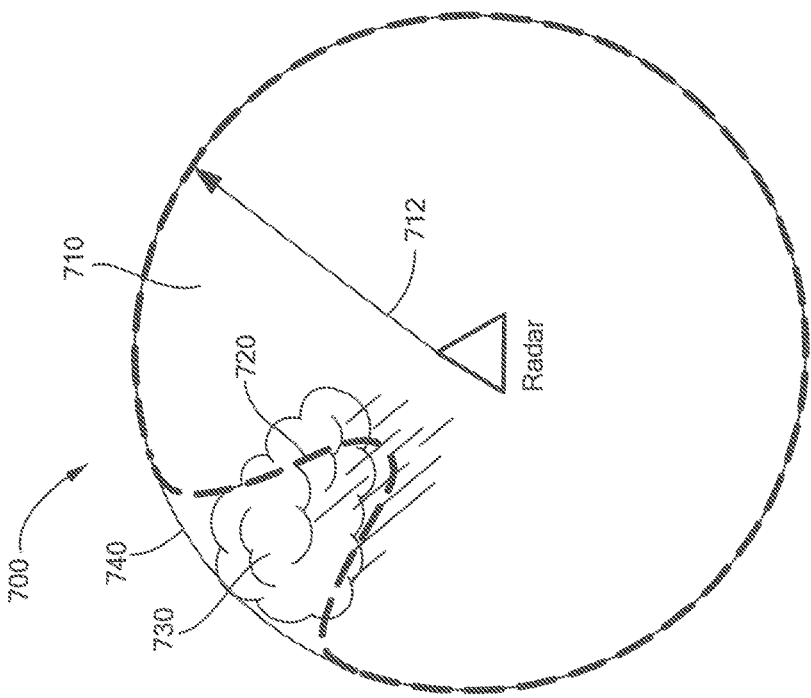

FIGS. 7a-b illustrates the benefit of dynamic azimuth scanning according to an embodiment. FIG. 7a shows an existing system 700. In the clear weather areas 710, the maximum target range 712 is achieved. However, the target range is diminished 720 in the area of the storm 730. FIG. 7a shows, in the area of the storm 730, what the clear weather maximum target range 740 would be.

FIG. 7b shows the effect of dynamic scanning 750 according to an embodiment. The dynamic scanning 750 shown in FIG. 7b provides a substantially uniform target range performance 760 in the presence of non-uniform loss. The maximum range 770 with dynamic scanning is less than the maximum range 790 without dynamic scanning. Thus, dynamic scanning 750 compensates for the loss in the storm area 780 using power that would have been used in the clear weather area 710.

Figure 8B:
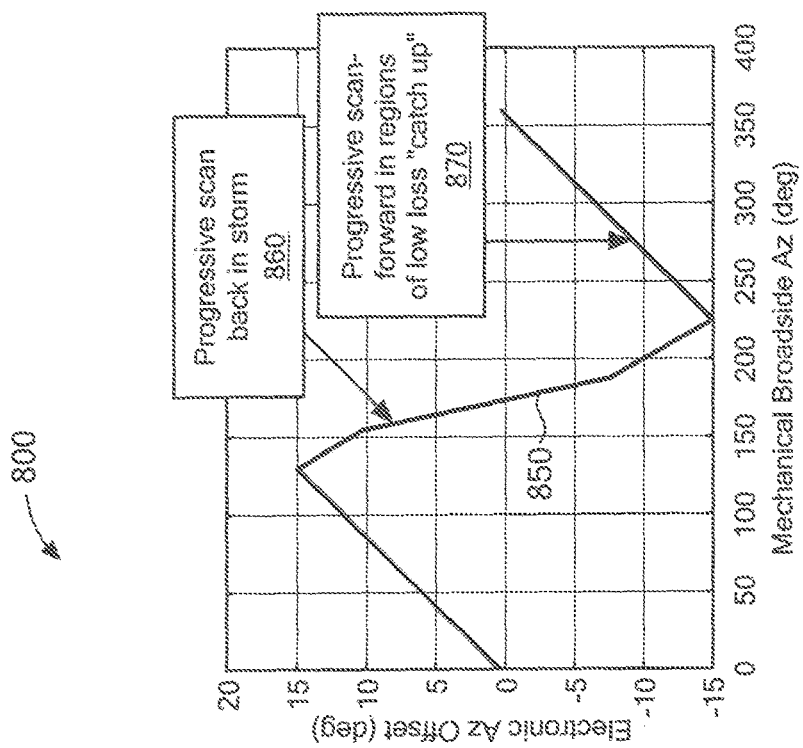
FIGS. 8a-b provide an overview of the dynamic scan offset process according to an embodiment.
Figure 8A:
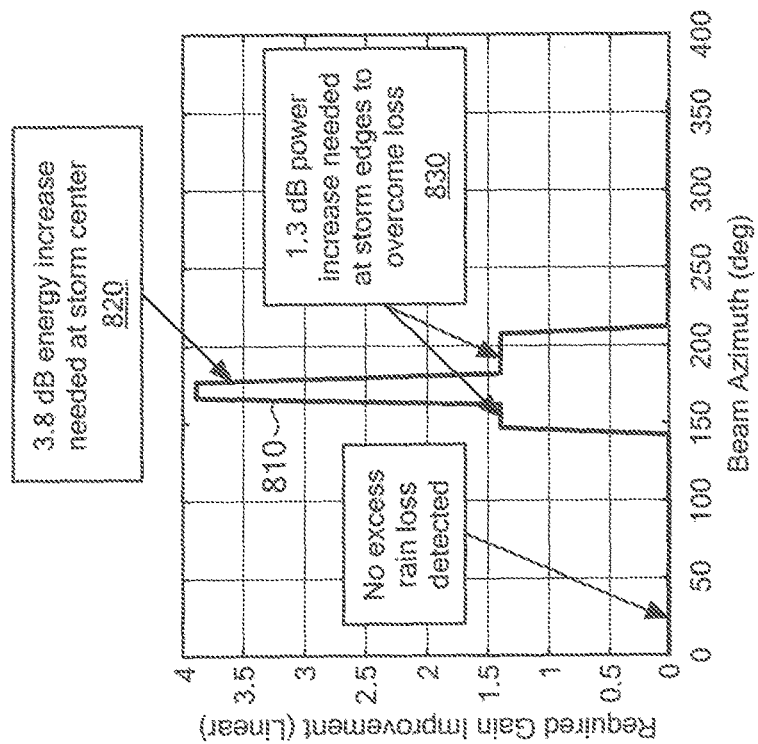

FIGS. 8a-b provides an overview of the dynamic scan offset process 800 according to an embodiment. In FIG. 8a a weather survey is used to measure rain loss. The gain improvement 810 is determined based on the amount of energy increase that is used at different azimuths of the 360° mechanical rotation. As shown in FIG. 8a, a 3.8 dB energy increase 820 is used at the storm center to overcome loss due to the storm. A 1.3 dB power increase 830 is used at the storm edges.

The gain profile is then used to derive the azimuth offset profile 850 shown in FIG. 8b. A progressive scan back 860 is used in the area of the storm to provide the additional power to compensate for rain loss. A progressive scan forward 870 is used in regions of low loss to allow the beam to catchup, i.e., the azimuth of the beam is scanned forward to adjust for the progressive scan back.

Moreover, the achieved gain profile used to determine switch in higher energy (longer duration) templates while retaining maximum azimuth spacing. Multiple template variants may be used. e.g., light, medium, heavy rain, for various steps of achieved gain. For example, 0-1.5 dB=light rain, 1.5-3 db=medium rain, >3 db=heavy rain. Each template provides an increased amount of energy commensurate with the steps, e.g., the heavy rain template, which is used for >3 dB gain, provides double the total transmit energy, and double the duration. Where achieved gain profile is in excess of the allocated template energy increase (e.g. a 2.5 dB gain profile used for a template which provides 1.5 dB more energy), the azimuth spacing is reduced. Lower azimuth spacing decreases overall beamshape loss and improves cumulative probability of detection, Pd.

More specifically, the weather survey capability uses a dedicated weather survey dwell template to detect and categorize rain at each azimuth angle. This survey is completed once every 10 minutes. For each dwell, the signal processor provides a radar cross section, range, and range extent of each rain detection. The data processor then uses this information to compute the rain rate and loss for each detection extent. Total loss at a given azimuth is computed by summing the loss of all detections at a given dwell azimuth angle. Loss is discretized into azimuth bins and then inverted to solve for G(i), which is used in the dynamic scan offset. G(i) is the inverse gain, which is the inverse of the rain loss.

For each weather survey dwell, the signal processor provides radar cross section (RCS) and Range (R) for each rain detection. The azimuth is assumed to be equal to the dwell transmit center azimuth. The extent of the detection is equal to a system adjustable parameter (SAP) value accessible by the radar data processor and signal processor, referred to herein as EXTENT, in units of meters.

The rain rate for each detection can be derived from the RCS as follows: rainrate=$(RCS/(K\ f^4))^{0.625}$ where, RCS=normalized rain RCS (linear units m2/m3), K=7×10-48, f=frequency in Hz used for weather survey dwell, and rainrate=rain rate in mm/hr. Once the rainrate is known for a given detection, the precipitation attenuation can be estimated as follows:

$$\gamma = k\ r^\alpha,$$

where γ=attenuation coefficient, in units of dB/km and k=the k value (in dB/km) provided in Table 1, as a function of frequency, linearly interpolated to frequency of the center of the surveillance operating frequency band.

TABLE 1

Rain Attenuation Coefficients

| Frequency (GHz) | k (dB/km) | α |
|---|---|---|
| 1 | 3.70 (10)-5 | 0.896 |
| 2 | 1.46 (10)-4 | 0.943 |
| 4 | 6.20 (10)-4 | 1.098 |
| 6 | 1.65 (10)-3 | 1.287 |
| 8 | 4.24 (10)-3 | 1.319 |
| 10 | 9.49 (10)-3 | 1.270 |

In addition, α=coefficient, unitless and r=rainrate, the detected rain rate in mm/hr. The total loss from precipitation, $L_{precip}$ for a rain detection is given by:

$$L_{precip} = \gamma\ EXTENT/1000, (in\ dB),$$

where EXTENT/1000 is the rain detection extent system adjustable parameter (SAP) in meters, converted to km.

In addition to precipitation attenuation, it is assumed that there is cloud attenuation as well. If the rain rate of a detection is below 4 mm/hr, the cloud attenuation coefficient, A, is assumed equal to the linear interpolation of the A values in Low Rate column to the surveillance center frequency, in Table 2. If the rain rate of a detection is greater than or equal to 4 mm/hr, the cloud attenuation coefficient is assumed equal to the linear interpolation of the A values in High Rate column to the surveillance center frequency, in Table 2.

TABLE 2

Cloud Attenuation Coefficients

| Frequency (GHz) | A (dB/km) Low Rate | A (dB/km) High Rate |
|---|---|---|
| 1 | 2.08 (10)-4 | 1.10 (10)-3 |
| 2 | 7.91 (10)-4 | 4.19 (10)-3 |
| 4 | 3.01 (10)-3 | 1.60 (10)-2 |

TABLE 2-continued

Cloud Attenuation Coefficients

| Frequency (GHz) | A (dB/km) Low Rate | A (dB/km) High Rate |
|---|---|---|
| 6 | 6.59 (10)-3 | 3.49 (10)-2 |
| 8 | 1.15 (10)-2 | 6.09 (10)-2 |
| 10 | 1.77 (10)-2 | 9.36 (10)-2 |

Loss is from clouds in a given detection, wherein $L_{clouds}$, is equal to:

$L_{clouds} = A$ EXTENT/1000.(in dB).

Total rain loss for a detection is equal to $L_{det} = L_{precip} + L_{clouds}$. (in dB). The total rain loss, $L_{total}$, a positive value in dB for the weather survey dwell is equal to the sum of $L_{det}$ for all rain detections in the dwell. This loss is converted to linear to solve for linear gain used to overcome the loss:

$G_{meas} = 10 \wedge (L_{total}/10)$.

The weather map contains N azimuth sectors and for each individual sector stores:
A boolean indicator of whether rain has been detected
Mapped gain value, $G_{map}$ as computed below
The dynamic scan offset values for sector edges as described in Section 3 of this document
Scheduled gain value, $G_{sched}$, as described in Section 3 of this document
Weather template selection (Light, Medium, or Heavy)

For each sector, i, of the weather map, the weather detection indicator is set to true if all weather survey dwells in that sector had one or more rain detection for the current weather survey cycle. The $G_{meas}$ value for each sector i is set to the average $G_{meas}$ value of all dwells in that sector for the current weather survey cycle. For all sectors which have the rain detection indicator set to true, the $G_{meas}$ values are scaled by a constant to account for range relaxation for the rain environment, and limited to minimum and maximum values. These scale parameter (SCALE_SAP) and limits (MIN_SAP, MAX_SAP) are SAP adjustable value. The formula for computing the final stored $G_{map}$ values is as follows:

$G_{map}(i) = $ MAX(MIN($G_{meas}(i)$/SCALE_SAP, MAX_SAP), MIN_SAP), where SCALE_SAP is set nominally to 1.5 linear, or 1.8 dB, which is the adjustable radar system allocation for sensitivity reduction when rain is present, MIN_SAP is set nominally to 0.91 linear, or −0.4 dB which aligns with the 10% scan speedup for light distributed rain, and MAX_SAP is set nominally to 2.22 linear, or 3.4 dB, which aligns to the slowdown (0.45× nominal scanning) used in the heavy rain. If rain was not detected in all weather survey dwells for a given sector on the current weather survey cycle, $G_{map}(i)$ is set to 1.0 and the weather detection indicator is set false.

Figure 9:
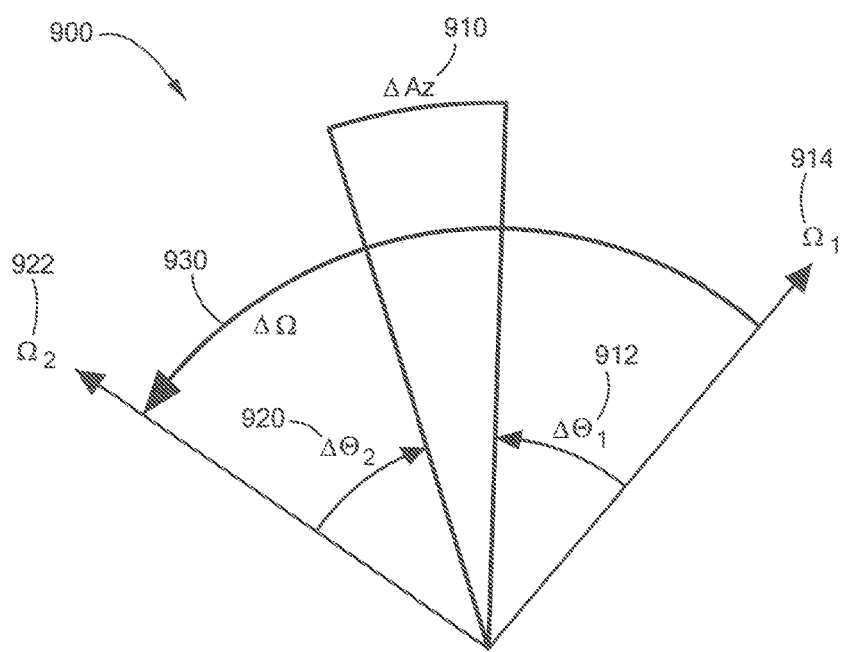
FIG. 9 shows the dwell time geometry according to an embodiment.
Figure 10:
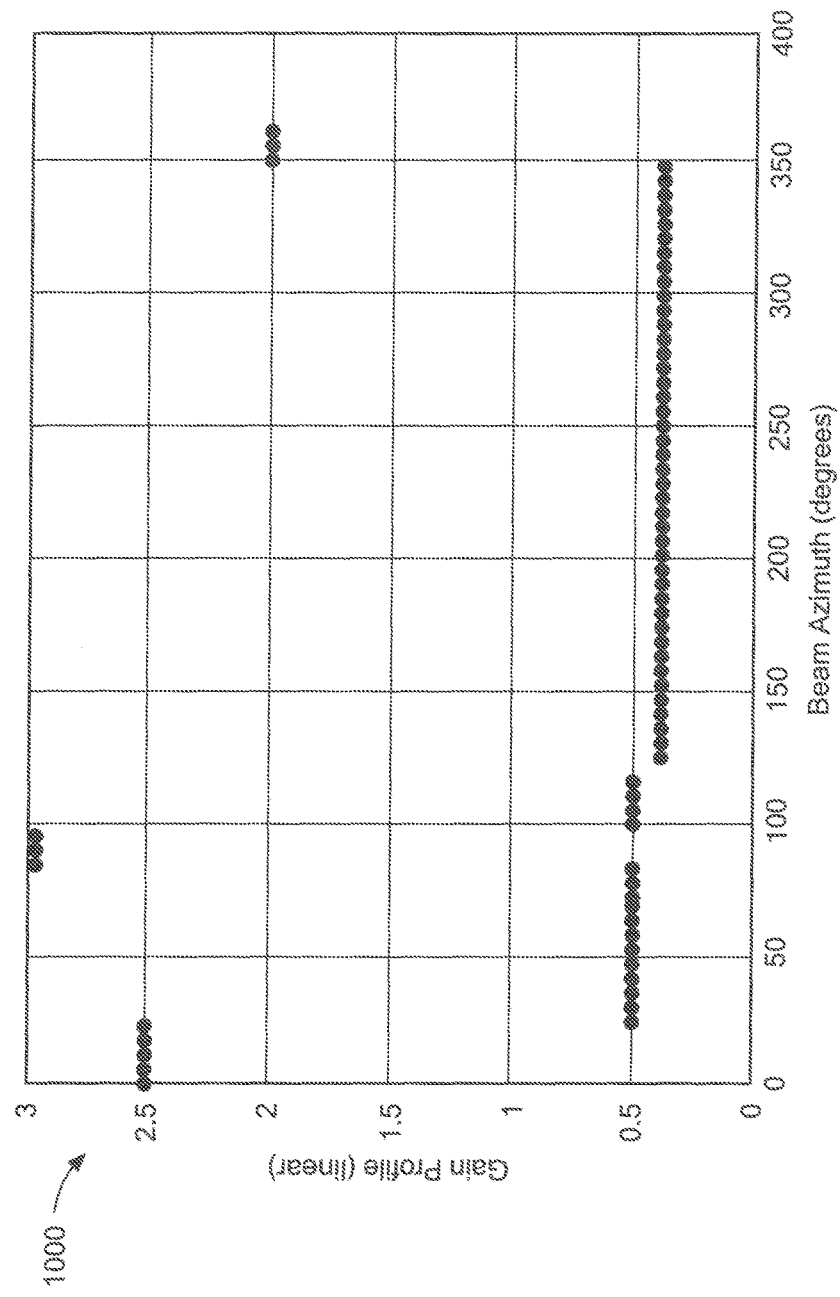
FIG. 10 illustrates a first example gain profile according to an embodiment.

Whenever the weather survey is complete, the scan profile for the dynamic scan offset is computed from $G_{map}$ (referred to simply as G below) as described below. The scheduler then uses the scan profile on a dwell basis to determine the azimuth offset relative to broadside. The rotating antenna dwell time is inversely proportional to the rate at which the beam sweeps in azimuth, which is the sum of the constant mechanical rotation rate plus the rate of electronic scan in azimuth. FIG. 9 shows the dwell time geometry 900 according to an embodiment. In FIG. 9, an azimuth sector of width ΔAz 910 is shown. The electronic scan angle is advanced by an amount Δθ1 912 at the start of the sector, where the antenna rotation angle is Ω1 914. The beam is scanned backward at a constant rate across the sector so that the electronic scan angle is backward by an amount Δθ2 920 at the end of the sector, where the antenna rotation angle is Ω2 922. The total mechanical rotation, ΔΩ2 930, is equal to Ω2−Ω1. The total electronic scan, Δθ 930, is equal to Δθ1+Δθ2. The total dwell time in the azimuth sector is increased by a factor G relative to the nominal time with no electronic scan as given in Equation 1. Equation 2 solves this for the total scan angle Δθ to achieve a specified gain for a specified sector width. The width of the azimuth sector requiring a given gain is limited by the maximum scan angle allowed for acceptable scan loss as given in equation 3. Table 1 and FIG. 10 give some examples.

$$G = \frac{\Delta\Omega}{\Delta Az} = \frac{\Delta Az + \Delta\theta}{\Delta Az} \quad \text{(Eqn. 1)}$$

$$\Delta\theta = (G-1)\Delta Az \quad \text{(Eqn. 2)}$$

$$\Delta Az, \max = \frac{\Delta\theta \max}{G-1} \quad \text{(Eqn. 3)}$$

The weather survey capability will determine the rain severity as a function of beam azimuth angle such that a factor G (inverse of rain loss) can be mapped out as a function of beam azimuth. Assuming N equally sized sectors dividing all of the azimuth space, the weather survey capability will yield a G(i) for each sector i of width ΔAz_i=360/N. G(i) will be constrained to be less than or equal to $G_{max}$ (set as a SAP) which represents a limit to the amount of loss that can be recovered with dynamic scanning G(i)=MAX(G(i), $G_{max}$).

If the radar is using mixed sectors of Weather sectors at some azimuths and Nominal or Clutter at other azimuths, the Nominal and Clutter sectors will use a G of 1.0. This assumes no margin. Sectors where no radiation is commanded as a result of a surveillance sector definition which does not cover all 360 degrees of azimuth represent a special case. This happens if the surveillance sectors do not span all 360 degrees, and also whenever an RF (radio frequency) blanking sector is used. In these sectors of no radiation, there is an opportunity for jumping forward in scan angle to make up time. The amount of scan that can be gained in these sectors is theoretically the width of the sector, though in practice the algorithm limits this value to avoid excessive scan loss. For any sector that is not radiating, a G of 0.91 will be assumed (1/1.1) to treat it the same as light rain. In other embodiments, blanking sectors are utilized.

The dynamic scan offset works by balancing all sectors to try and get as close to the target G profile goal as possible. In cases where the amount of scan-back used, to meet rain performance is not achievable, the scan-back profile is skewed to uniformly degrade the scan-back slope for all sectors including rain. Currently, as described above, the sectors which provide scan-time margin are light rain sectors (~1 mm/hr) and sectors with no radiation. As an extreme example case you could have heavy rain present for 180 degrees (G=2.2, max value) of azimuth and nominal is at the other 180 degrees (G=1), this process will degrade each sector relative to the ideal G value, and after all scaling and limiting is complete, the heavy rain sector will have a G of 1.22 and the nominal sector will have a G of 0.78. The primary limiter is the scan offset limit, which is set to 20 degrees for this example. The heavy rain sector will be 2.5 dB short of its target and the nominal will be 1.1 dB short of its target.

After setting G(i), the amount of electronic scan used in each sector is given by Equation 4.

$$\Delta\theta_{i\_initial} = (G(i)-1)*360/N \quad \text{(Eqn. 4)}$$

In order to ensure that the dynamic scan profile as a function of azimuth can be scheduled, the profile is scaled to ensure that the net electronic scan for a full rotation period of the radar is zero. This is done by summing the amount of electronic scan in each sector (as in Equation 5) and then applying a linear correction to the electronic scan in each sector as a function of i as in Equation 6, where, i=1 . . . N $$\Delta\theta_{net} = \sum_{i=1}^{N} \Delta\theta_{i\_initial} \quad \text{(Eqn. 5)}$$

$$\theta_{i\_corr1} = -(\text{cumsum}(\Delta\theta_{i_{initial}}) - i*\Delta\theta_{net}/N) \quad \text{(Eqn. 6)}$$

where cumsum is the cumulative sum of the elements in the array.

A value of 0 is concatenated to the beginning to represent the 0 degree azimuth edge of the first bin. The current array of values represents the angle offset at each sector edge location i*360/N from i=0 to i=N.

$$\theta_{i_{corr1}}(i=0) = 0 \quad \text{(Eqn. 7)}$$

The profile computed in Equation 7 is consistent, in that the electronic scan angle at i=0 (0 degrees azimuth) is equal to the electronic scan angle for i=N (360 degrees). The scan profile is next biased to ensure that the electronic scanning is relative to a nominal electronic surveillance scan angle off azimuth broadside. This is done by subtracting the mean scan offset as in Equation 8 and adding the nominal surveillance angle α nominal.

$$\theta_{i\_corr2} = \theta_{i\_corr1} - \frac{1}{N}\sum_{i=1}^{N}\theta_{i\_corr1} + \alpha_{nominal} \quad \text{(Eqn. 8)}$$

This yields a profile that is now consistent (returns to same scan angle every rotation without gaps), and is properly centered on the nominal surveillance steer angle $\alpha^{nominal}$ (set as a system adjustable parameter). The final adjustment to this profile is to scale the profile such that the maximum cumulative electronic offset, $\theta_{max}$, is capped at $\theta_{limit}$ (set as a system adjustable parameter). This is done to prevent excessive electronic scanning off broadside that would either violate the electronic scan limits of the radar or cause excessive scan loss.

$$\theta_{max} = \max(\text{abs}(\theta_{i_{corr2}})) \quad \text{(Eqn. 9)}$$

$$\theta_{i\_final} = \theta_{i\_corr2} * \text{MIN}(\theta_{max}, \theta_{limit})/\theta_{max} \quad \text{(Eqn. 10)}$$

The final step is to provide a formula to compute the exact electronic scan offset as a function of beam azimuth angle for any given dwell using linear interpolation. Given a generic radar azimuth angle, Az, falling in sector n, the sector edges are at azimuth angles (n−1)*360/N and n*360/N, the electronic scan offset of the dwell given in Equation 11:

If n is not equal to N, $$\theta(Az_{beam}) = \theta_{i_{final(i=n-1)}} + \quad \text{(Eqn. 11)}$$
$$\text{mod}\left(Az_{beam}, \frac{360}{N}\right) * \frac{N}{360} * \left(\theta_{i_{final(i=n)}} - \theta_{i_{final(i=n-1)}}\right)$$

$$\theta(Az_{beam}) = f1(Az_{beam}) \quad \text{(Eqn. 12)}$$

The radar data processor scheduler, however does not use the offset as a function of beam azimuth. Rather it uses the beam offset as a function of mechanical broadside angle. Mechanical Az is related to beam azimuth as follows in Equation 13.

$$Az_{mechanical} = Az_{beam} - f1(Az_{beam}) \quad \text{(Eqn.13)}$$

The offset as a function of mechanical broadside azimuth is found by substituting Equation 13 into Equation 12 and then wrapping the result to ensure it is centered on a +/−180 interval.

$$\theta(Az_{mechanical}) = \text{mod}(f1(Az_{beam} - f1(Az_{beam})) + 180, 360) - 180 \quad \text{(Eqn.12)}$$

The derivative of the final profile with respect to beam azimuth angle is used to determine how much gain the final profile has achieved and is used to aid in template selection. Higher gain profiles mean more dwell time spent per azimuth angle and therefore longer templates can be used.

For each AZSTEP degree increment m (with AZSTEP nominally set to 1 degree) of mechanical broadside azimuth angle, the realized amount of gain relative to normal scanning is computed from the first difference of the profile of offset versus mechanical broadside azimuth angle:

$$G_{sched}(m) = \frac{(Az_{mechanical}(m) - Az_{mechanical}(m-1))}{(Az_{mechanical}(m) - Az_{mechanical}(m-1)) + \theta(Az_{mechanical}(m)) - \theta(Az_{mechanical}(m-1))}$$

This value $G_{sched}$ represents the actual gain of the scan profile that will be scheduled. Template selections are based made on this parameter as follows: If $G^{sched}(m)$ is less than LIGHT_SAP, the Light weather template is used. Else if $G_{sched}(m)$ is less than MEDIUM_SAP, the Medium weather template is used. Else, use the Heavy weather template. When scheduling the templates in each sector, in order to ensure that no elevation angles are skipped on transition between sectors where the template changes, the elevation scan of template from the previous sector is allowed to run to completion before starting the elevation scan from a different template in the next sector.

FIG. 10 illustrates a first example gain profile 1000 according to an embodiment. In FIG. 10, the first example gain profile 1000 is a function of beam azimuth made up of 1× gain (nominal—no rain), 0.9× gain (light rain), 2× gain (medium rain), and 3× gain (heavy rain) sectors. This profile example uses 72 sectors each 5 degrees wide. Each dot on the figure represents the gain value of a single sector. This gain data, G(i), is converted to angle offsets with the Equations 4-11.

Figure 11:
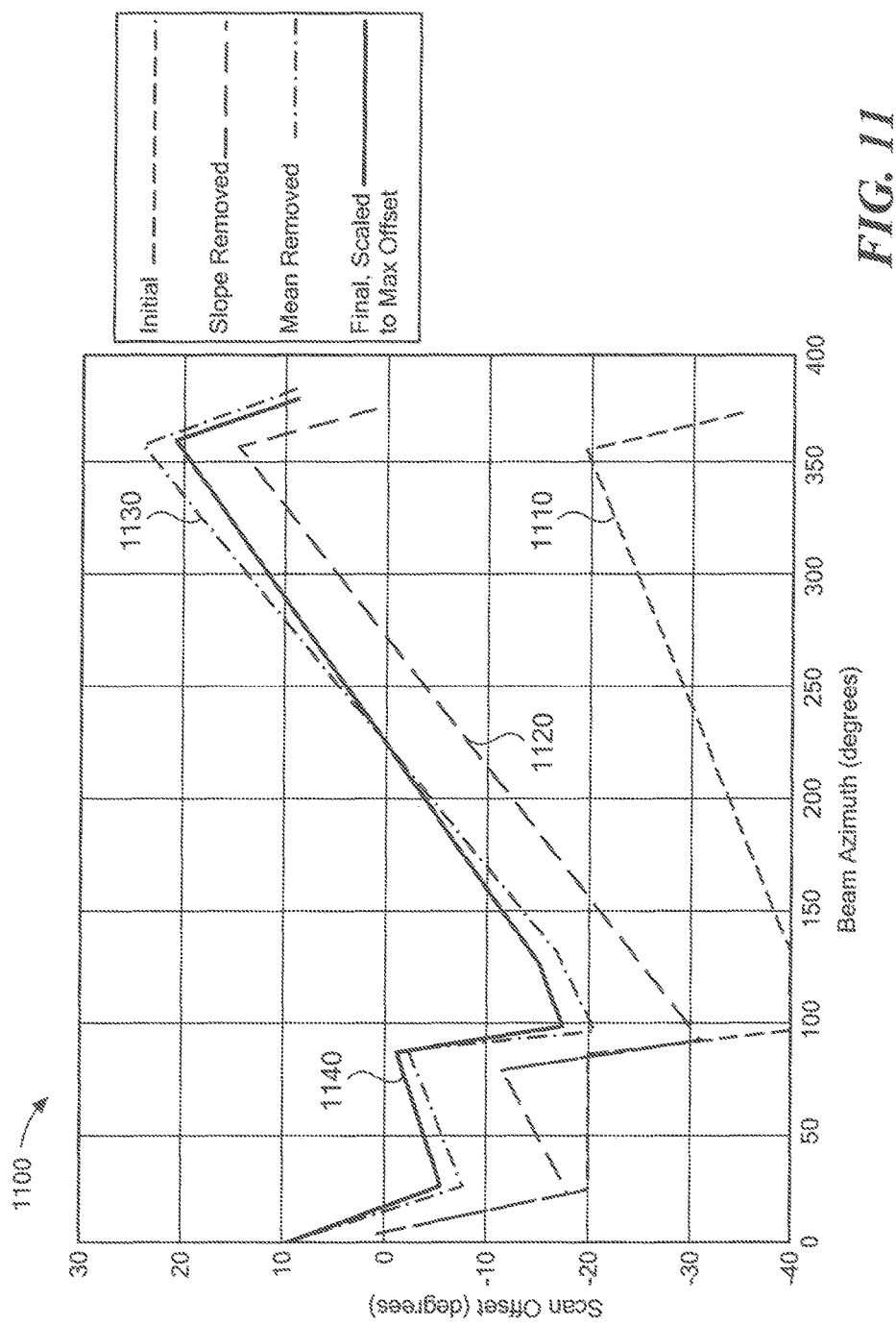
FIG. 11 shows the scan offset profile at different beam azimuths according to an embodiment.

FIG. 11 shows the scan offset profile 1100 at different beam azimuths according to an embodiment. In FIG. 11, an initial scan offset profile 1110, a scan offset profile having a linear correction applied to remove slope 1120, a scan offset profile having the mean removed and the nominal surveillance angle adjusted 1130 and a final scan offset profile scaled to the maximum offset 1140 are plotted. The total dwell time in the azimuth sector is increased by a factor G relative to the nominal time with no electronic scan as given in Equation 1. After computing the initial profile 1110, it is apparent that the scan angle at 360 degrees azimuth is not equal to the scan offset at 0 degrees. This is corrected by applying a linear correction, as in Equation 6, to produce the scan offset profile having a linear correction applied to remove slope 1120, followed by the removal of the mean and the adjustment of the nominal surveillance angle as in Equation 8 to produce the mean removed scan offset profile 1130. Finally, the scan offset is scaled to the maximum offset, as in Equation 10, to produce the final scan offset profile 1140. In FIG. 11, a negative scan offset means that the electronic beam steer is lagging the mechanical boresight, and a positive offset means the electronic beam steer is leading the mechanical boresight.

Figure 12:
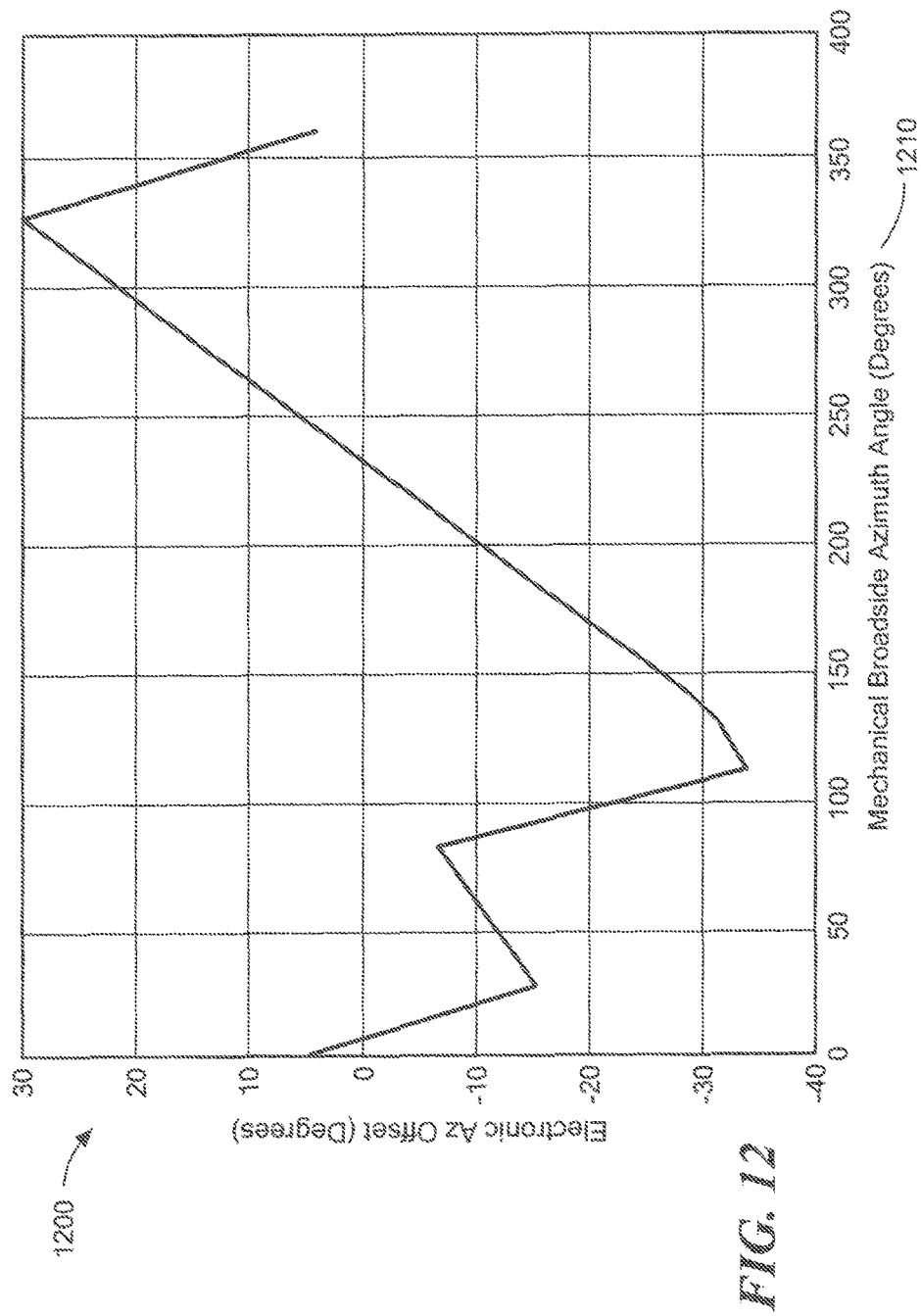
FIG. 12 shows the final scan offset profile according to an embodiment.

FIG. 12 shows the final scan offset profile 1200, In FIG. 12, the final scan offset profile 1200 is mapped into a function of mechanical broadside azimuth angle 1210 for use in the radar scheduler as the radar rotates. The relation that the mechanical azimuth is equal to beam azimuth minus the scan offset when comparing FIGS. 11 and 12.

Figure 13:
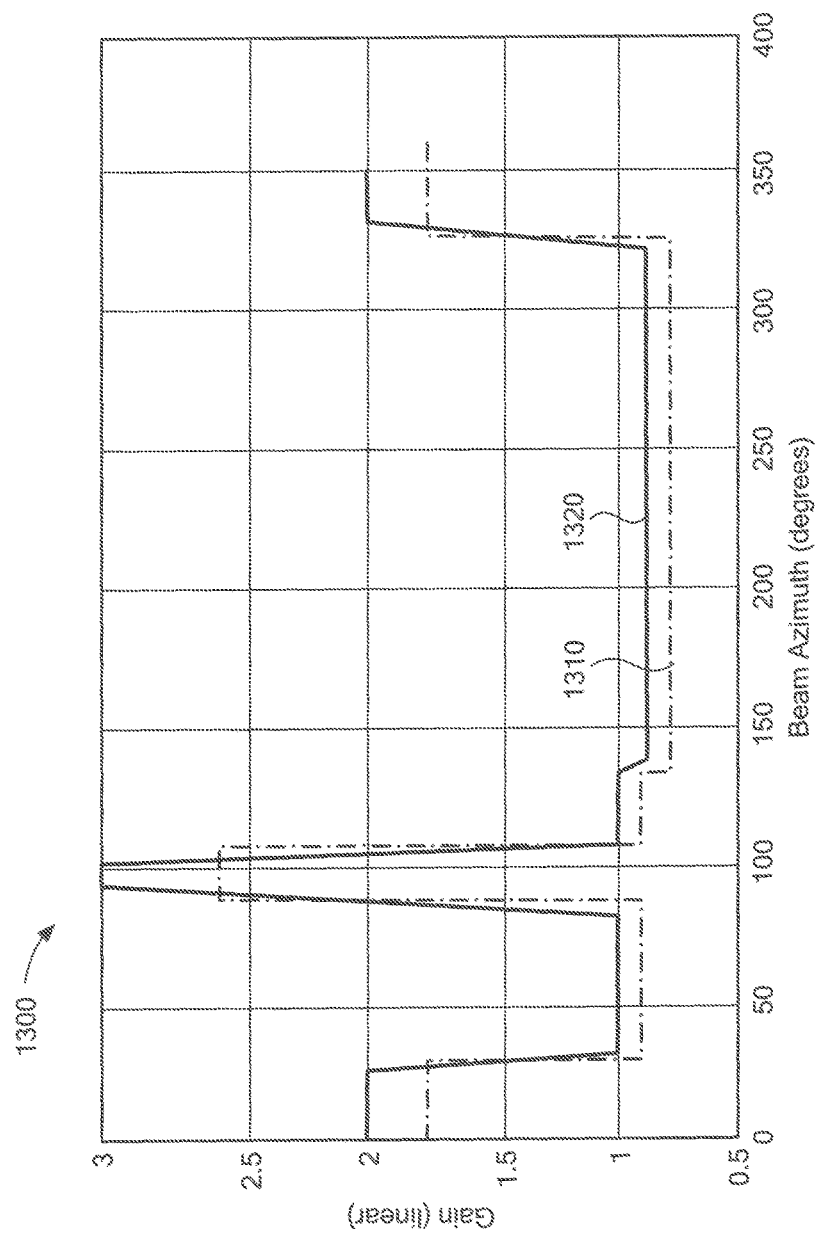
FIG. 13 shows a comparison of gain profiles according to an embodiment

FIG. 13 shows a comparison of gain profiles 1300. The final achieved scan gain profile 1310 according to an embodiment is compared to the original gain goal 1320 of FIG. 10. As noted, the achieved gains 1310 are slightly lower than the original target 1320. The slightly lower gain is a result of the slope removal and scaling process used to ensure a consistent schedule with limited scan loss and a maximum electronic azimuth scan angle constraint.

Figure 14:
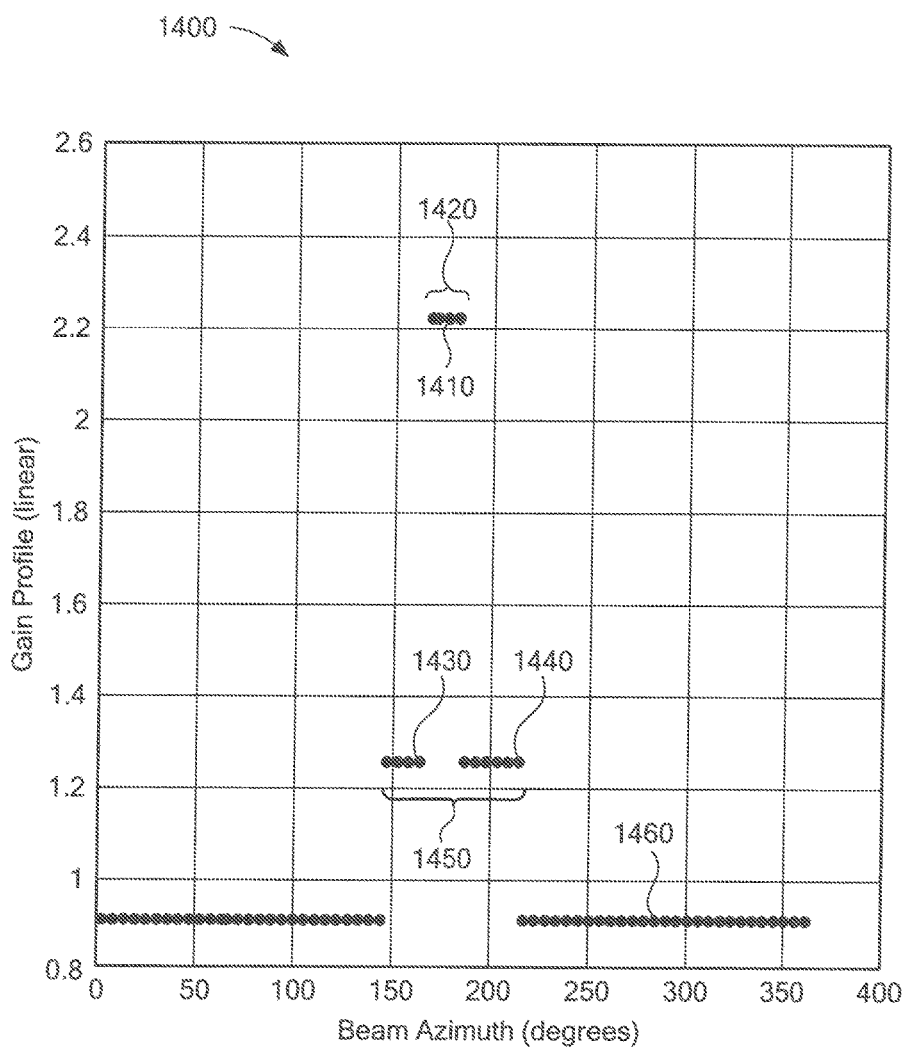
FIG. 14 shows the linear gain factor mapped out in beam azimuth space for a second example rain environment according to an embodiment.

FIG. 14 shows the linear gain factor mapped out in beam azimuth space 1400 for a second example rain environment according to an embodiment. In the second example, a rain environment has 2 storm cells collocated at a single azimuth angle and light rain everywhere else. When looking through the cells, there is approximately 3.5 dB extra average loss that cannot be made up by the 1.8 dB rain range relaxation. This equates to a factor of 2.2 1410 linear and covers a region of approximately 15 degrees azimuth 1420. Just left and right of this region, is azimuth angles 1430 where the near-in rain cell is present on the radial path. In those regions there is approximately 1 dB of extra loss that is not compensated by the 1.8 dB range relaxation, or 1.25 linear gain factor 1440. This cell region covers a total span of about 60 degrees 1450. The remaining regions are light rain. In the light rain, there is a surplus of about 0.4 dB margin after taking the 1.8 dB range relaxation. This equates to a 0.9 linear gain factor 1460.

Figure 15:
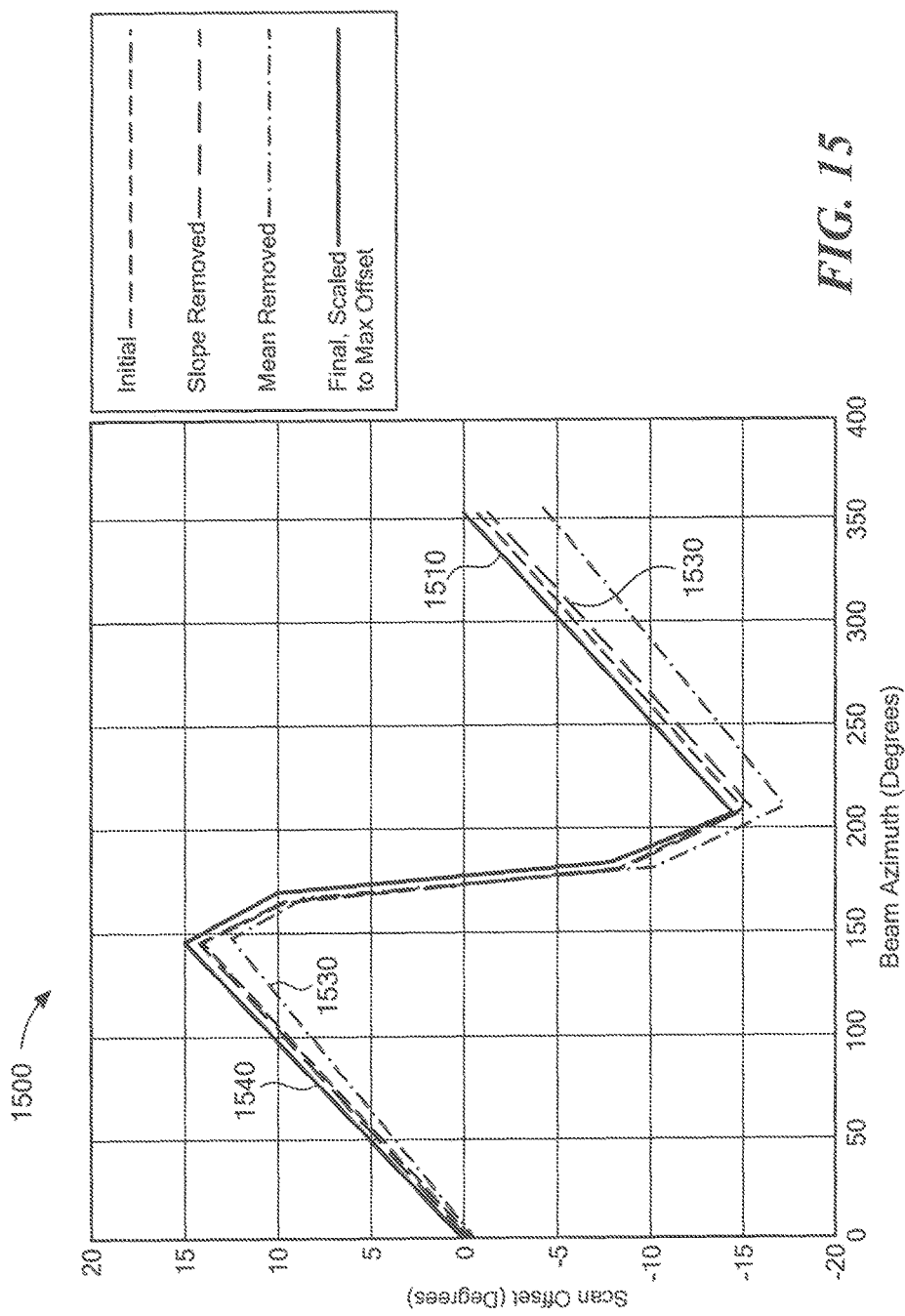
FIG. 15 shows the scan profile generation process steps as a function of beam azimuth according to an embodiment.

FIG. 15 shows the scan profile generation process steps as a function of beam azimuth 1500 according to an embodiment. In FIG. 15, an initial scan offset profile 1510, a scan offset profile having a linear correction applied to remove slope 1520, a scan offset profile having the mean removed and the nominal surveillance angle adjusted 1530 and a final scan offset profile scaled to the maximum offset 1540 are again plotted. However, as observed in this case, minimal modification was used from the initial profile which is indicative that this environmental loss profile can be compensated with dynamic scan.

Figure 16:
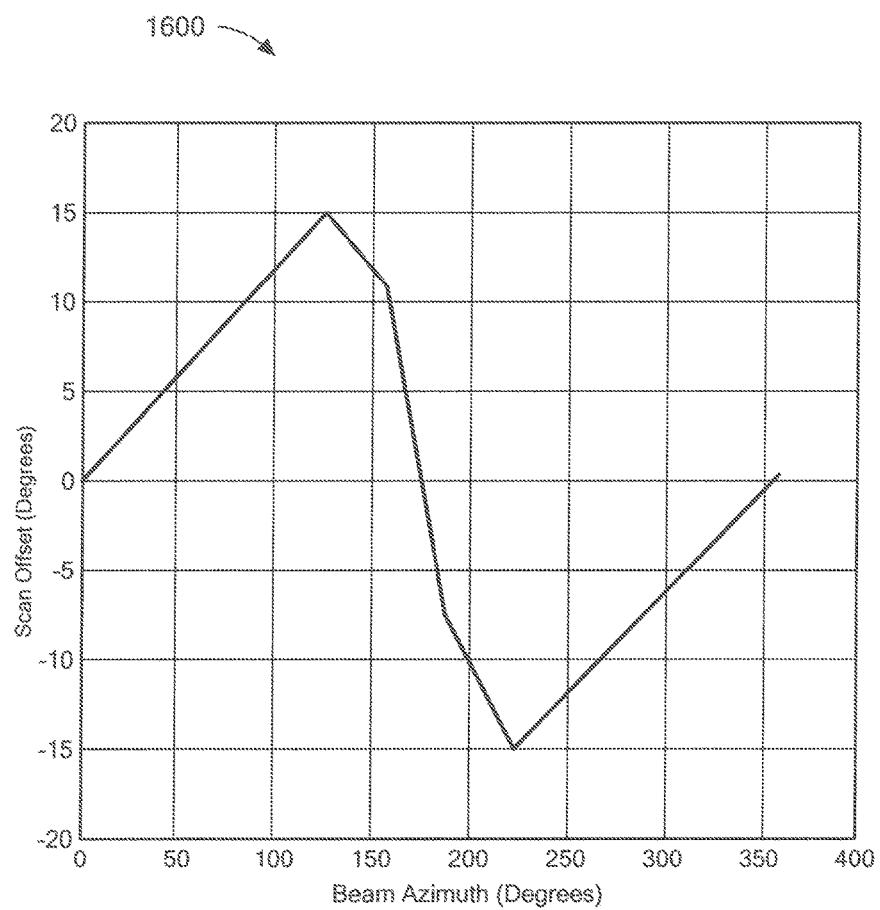
FIG. 16 shows the final gain profile as a function of mechanical broadside azimuth angle according to an embodiment.

FIG. 16 shows the final gain profile 1600 as a function of mechanical broadside azimuth angle according to an embodiment.

Figure 17:
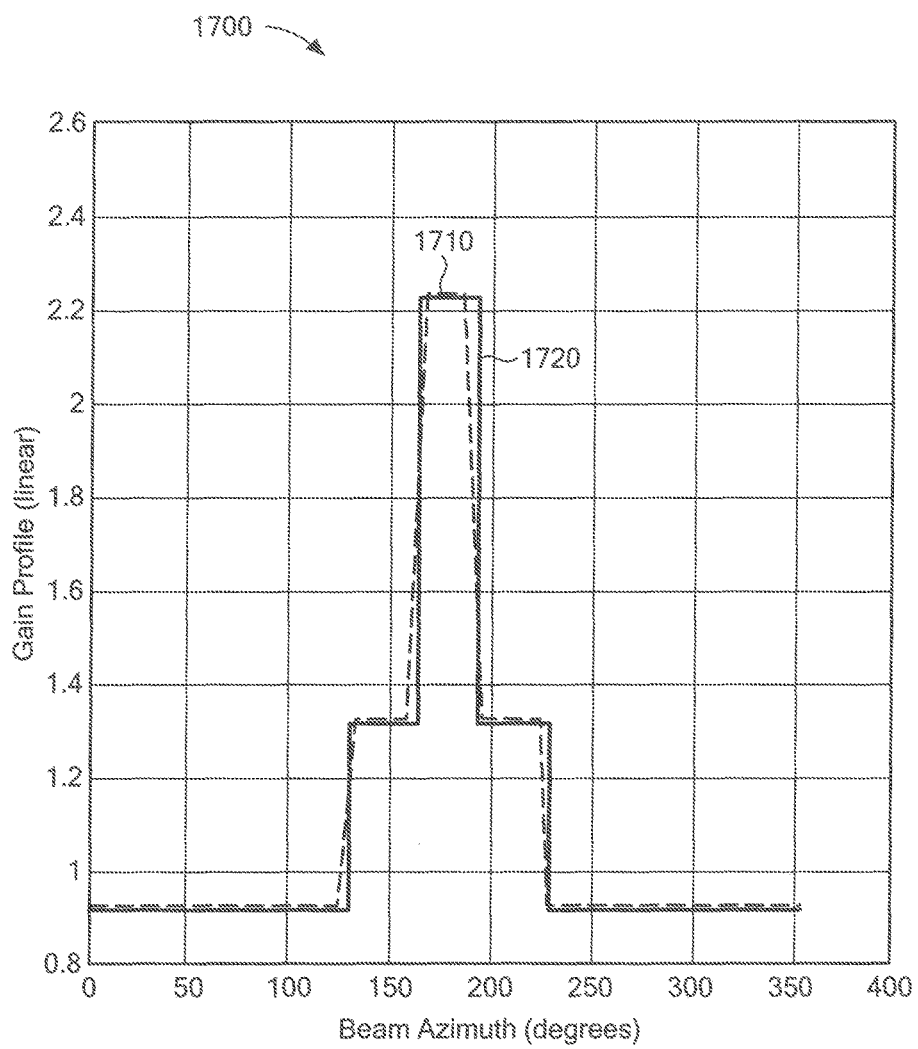
FIG. 17 shows the achieved scan gain and original target scan gain.

FIG. 17 shows the achieved scan gain 1710 and original target scan gain 1720. The achieved gain from dynamic scan is nearly identical to the original target gain profile.

While the dynamic electronic azimuth scanning has been described using rain and weather surveys, dynamic azimuth scanning may be applied to an operator defined gain profile for enhanced surveillance sectors. For example, an operator may define sectors of azimuth where they would like higher probability of detection, Pd, or a longer target range. This would allow the operator to focus resources on high-interest areas.

Figure 18:
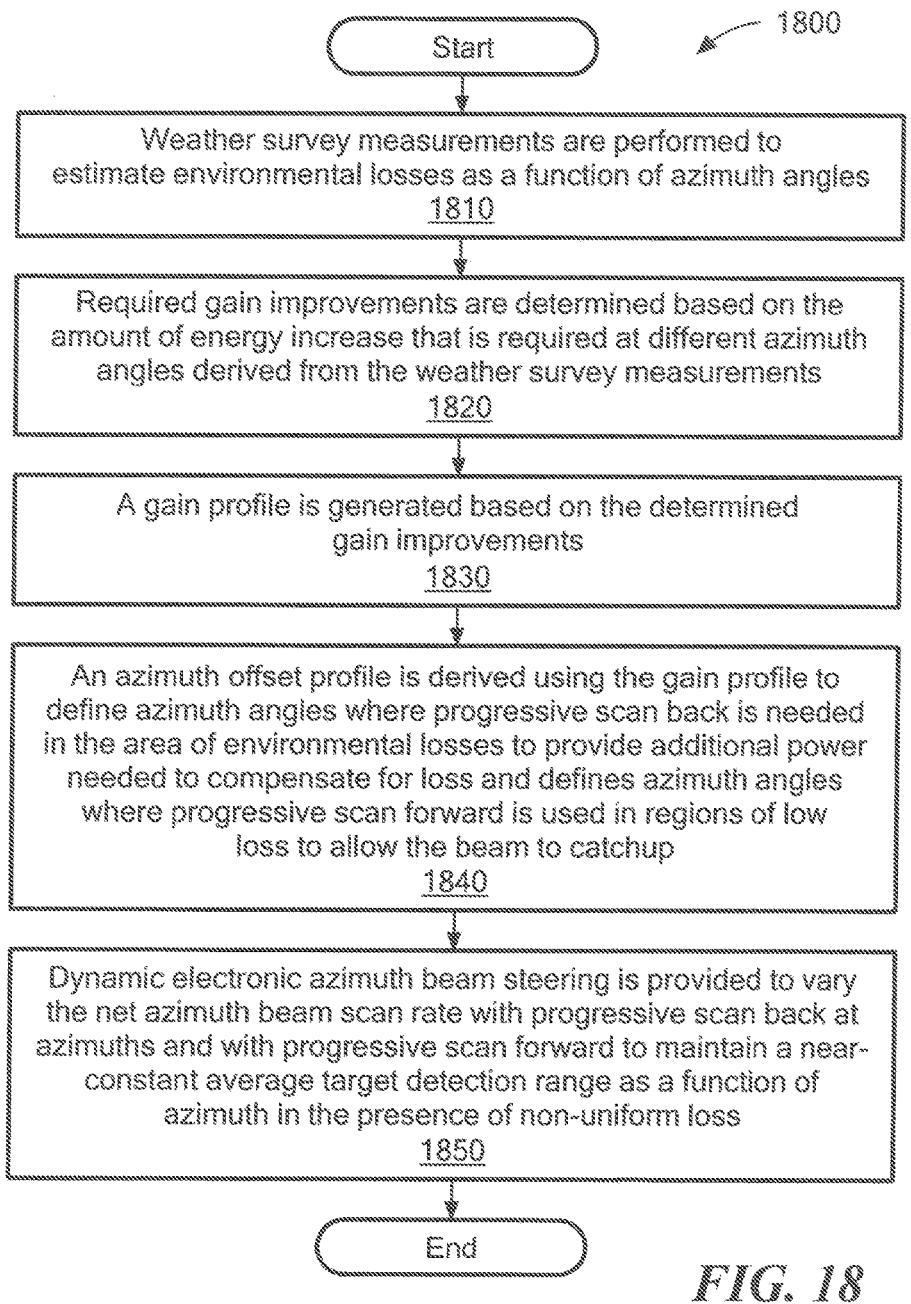
FIG. 18 is a flow chart of a method for performing dynamic azimuth scanning for rotating active electronic scanned array radar.

FIG. 18 is a flow chart 1800 of a method for providing dynamic azimuth scanning according to an embodiment. Azimuth loss survey measurements, e.g., weather survey measurements, are performed to estimate environmental losses as a function of azimuth angles 1810. Gain improvements are determined based on the amount of energy increase that is used at different azimuth angles derived from the weather survey measurements 1820. A gain profile is generated based on the determined gain improvements 1830. An azimuth offset profile is derived using the gain profile to define azimuth angles where progressive scan back is used in the area of environmental losses to provide additional power used to compensate for loss and defines azimuth angles where progressive scan forward is used in regions of low loss to allow the beam to catchup 1840. Dynamic electronic azimuth beam steering is provided to vary the net azimuth beam scan rate with progressive scan back at azimuths and with progressive scan forward to maintain a near-constant average target detection range as a function of azimuth in the presence of non-uniform loss 1850. Rotation is accelerated and decelerated corresponding to radiated energy to achieve the substantially constant average target detection range.

Progressive scan back provides additional power to compensate for losses and progressive scan forward is used in regions of low loss to allow the beam to catchup to the zero 1840

Figure 19:
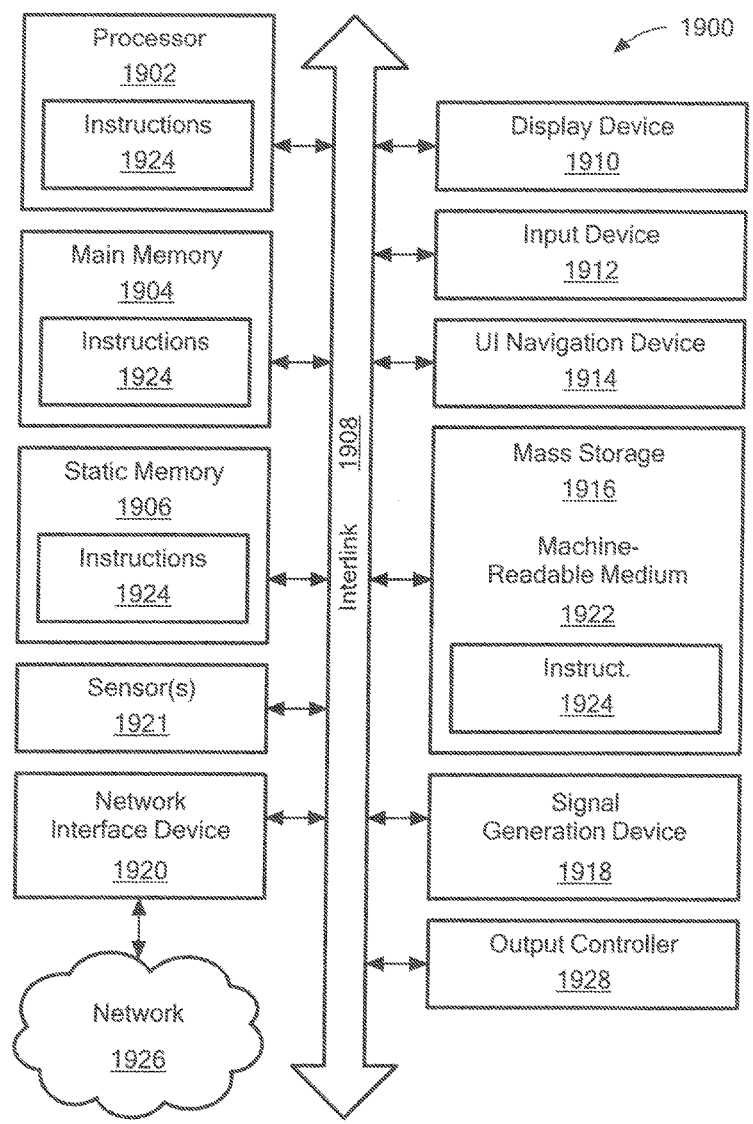
FIG. 19 illustrates a block diagram of an example machine for providing dynamic azimuth scanning for rotating active electronic scanned array radar according to an embodiment.

FIG. 19 illustrates a block diagram of an example machine 1900 for providing dynamic azimuth scanning for rotating active electronic scanned array radar according to an embodiment upon which any one or more of the techniques (e.g., methodologies) discussed herein may perform. In alternative embodiments, the machine 1900 may operate as a standalone device or may be connected (e.g., networked) to other machines. In a networked deployment, the machine 1900 may operate in the capacity of a server machine and/or a client machine in server-client network environments. In an example, the machine 1900 may act as a peer machine in peer-to-peer (P2P) (or other distributed) network environment. The machine 1900 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 1902 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations. Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module may not be instantiated at any one moment in time. For example, where the modules comprise a general-purpose hardware processor 1902 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 1900 may include a hardware processor 1902 (e.g., a central processing unit (CPU), a graphics processing unit (GPU), a hardware processor core, or any combination thereof), a main memory 1904 and a static memory 1906, at least some of which may communicate with others via an interlink (e.g., bus) 1908. The machine 1900 may further include a display unit 1910, an alphanumeric input device 1912 (e.g., a keyboard), and a user interface (UI) navigation device 1914 (e.g., a mouse). In an example, the display unit 1910, input device 1912 and UI navigation device 1914 may be a touch screen display. The machine 1900 may additionally include a storage device (e.g., drive unit) 1916, a signal generation device 1918 (e.g., a speaker), a network interface device 1920, and one or more sensors 1921, such as a global positioning system (GPS) sensor, compass, accelerometer, or other sensor. The machine 1900 may include an output controller 1928, such as a serial (e.g., universal serial bus (USB), parallel, or other wired or wireless (e.g., infrared (IR)) connection to communicate or control one or more peripheral devices (e.g., a printer, card reader, etc.).

The storage device 1916 may include at least one machine readable medium 1922 on which is stored one or more sets of data structures or instructions 1924 (e.g., software) embodying or utilized by any one or more of the techniques or functions described herein. The instructions 1924 may also reside, at least partially, additional machine readable memories such as main memory 1904, static memory 1906, or within the hardware processor 1902 during execution thereof by the machine 1900. In an example, one or any combination of the hardware processor 1902, the main memory 1904, the static memory 1906, or the storage device 1916 may constitute machine readable media.

While the machine readable medium 1922 is illustrated as a single medium, the term "machine readable medium" may include a single medium or multiple media (e.g., a centralized or distributed database, and/or associated caches and servers) that configured to store the one or more instructions 1924.

The term "machine readable medium" may include any medium that is capable of storing, encoding, or carrying instructions for execution by the machine 1900 and that cause the machine 1900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and compact disk-read only memory (CD-ROM) and digital video disk-read only memory (DVD-ROM) disks.

The instructions 1924 may further be transmitted or received over a communications network 1926 using a transmission medium via the network interface device 1920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 1920 may include one or more physical jacks (e.g., Ethernet, coaxial, or phone jacks) or one or more antennas to connect to the communications network 1926. In an example, the network interface device 1920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1900, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An active electronically scanning array (AESA), comprising:
   a plurality of radiating elements, a radiating element including a transmit-receive module for providing transmitter and receiver functions for each radiating element; and
   a controller, coupled to the plurality of transmit-receive modules, the controller arranged to provide dynamic electronic azimuth beam steering over a given search area, wherein the dynamic electronic azimuth beam steering is configured to vary a net azimuth beam scan rate, wherein the dynamic electronic azimuth beam steering provides a rate of forward scan or back scan at azimuth angles identified according to an azimuth offset profile, and wherein the dynamic electronic azimuth beam steering comprises configuring the AESA to provide:
   progressive scan back rotation at azimuths where dwell time is increased as compared to a nominal dwell time for the AESA, the nominal dwell time corresponding to a dwell time for the AESA where there is no electronic scan; and
   progressive scan forward rotation at azimuths where dwell time is reduced compared to the default dwell time for the AESA;
   wherein the dynamic electronic azimuth beam steering is configured to maintain a substantially constant average target detection range as a function of azimuth in a presence of one or more non-uniform loss conditions that exist within at least a portion of the given search area; and
   wherein the rate of forward scan or back scan, at azimuth angles identified according to the azimuth offset profile, controls an amount of time spent transmitting within any given azimuth region and allows non-uniform distribution of radar energy as a function of azimuth, such that when the one or more non-uniform loss conditions are present, the non-uniform distribution of radar energy is configured to compensate for the non-uniform loss conditions to provide a substantially uniform probability of detection (Pd).

2. The AESA of claim 1, wherein the controller uses one or more templates, each respective template having respective durations that achieve a respective, pre-set azimuth spacing of search beams based on a mechanical rate and the azimuth offset profile.

3. The AESA of claim 2, wherein the controller uses a single template for all 360 degrees azimuth, the single template defining a first respective configuration for a first respective fan of search beams, wherein the single template comprises a first azimuth spacing of search beams, wherein the azimuth spacing increases and decreases proportional to the rate of forward and back scanning.

4. The AESA of claim 2, wherein the controller uses multiple templates, at least one of the multiple templates defining a second respective configuration for a second respective fan of search beams and wherein the second respective configuration comprises a second azimuth spacing of search beams, wherein the second respective configuration differs from the first respective configuration.

5. The AESA of claim 4, wherein the controller uses the multiple templates by using, during the progressive forward scan, a second progressive forward scan template having a second spacing that is a broader spacing than a first spacing associated with a first template and using, during a progressive backward scan, a higher energy template having the same spacing as the first spacing but having an energy level that is higher than a first energy level associated with the first spacing.

6. The AESA of claim 1, wherein the plurality of radiating elements is configured to operate in a predetermined first scan using a first pre-set spacing between search beams and having a first predetermined amount of beam overlap between search beams and wherein the controller uses, in the progressive forward scan, a broader spacing between search beams than used in the predetermined first scan and uses, in the progressive backward scan, a tighter spacing than used in the predetermined first scan, the tighter spacing comprising an amount of beam overlap that is greater than the first predetermined amount of beam overlap.

7. The AESA of claim 1, wherein the azimuth offset profile corresponds to operator-defined gain characteristics.

8. A method for providing dynamic azimuth scanning, the method comprising:
   determining gain improvements needed to at least partially compensate for locally increased azimuth regions of loss in a search area scanned by an antenna array, wherein the gain improvements are based on a first amount of energy of a radar beam from the antenna array, the first amount of energy generated when the antenna array is used at a first set of different azimuth angles of a 360° mechanical rotation of the antenna array, without the gain improvements, wherein the determined gain improvements are at least partially derived using information relating to locally increased azimuth regions of loss;
   providing dynamic electronic azimuth beam steering configured to vary a net azimuth beam scan rate, the dynamic electronic azimuth beam steering configured to:
      use multiple templates, the multiple templates comprising at least a first template and a second template, wherein the first template comprises a first respective spacing of search beams at a first energy level and the second template comprises a second respective spacing of search beams, the second respective spacing being a broader spacing than the first respective spacing;
      provide progressive scan back rotation at azimuths where dwell time is increased as compared to a default dwell time for the antenna array, wherein the progressive scan back rotation uses a higher energy template having the first spacing but having a third energy level that is higher than the first energy level associated with the first spacing; and
      provide progressive scan forward rotation where dwell time is increased as compared to the default dwell time for the antenna array, to maintain a substantially constant average target detection range as a function of azimuth in a presence of non-uniform loss associated at least with the locally increased regions of loss, the progressive forward scan using the second template;
   generating a gain profile based on the determined gain improvements to identify gain to be applied at one or more azimuth angles of the first set of different azimuth angles of the 360° mechanical rotation; and
   deriving an azimuth offset profile using the gain profile, wherein the azimuth offset profile defines:
      a first subset of azimuth angles, associated with the locally increased azimuth regions of loss, the first subset comprising a first portion of the first set of different azimuth angles of the 360° mechanical rotation, where the antenna array is configured to use the progressive scan back in at least a portion of the locally increased azimuth regions of loss to provide additional energy to the radar beam, beyond the first amount of energy, to compensate for at least a portion of the locally increased azimuth regions of loss; and
      a second subset of azimuth angles corresponding to regions of low loss, the second subset comprising a second portion of the first set of different azimuth angles of the 360° mechanical rotation, wherein the antenna array is configured to use the progressive scan forward at the second subset of azimuth angles, the progressive scan forward configured to provide less energy to the radar beam, as compared with the first amount of energy.

9. The method of claim 8, wherein the deriving an azimuth offset profile further comprises:
   generating an initial azimuth offset profile;
   scaling the initial azimuth offset profile to ensure that a net electronic scan for a full rotation period of a radar that includes the antenna array is substantially zero by summing an amount of electronic scan in each sector and then applying a linear correction to the electronic scan in each sector to remove slope;
   biasing the scaled azimuth offset profile to ensure that the electronic scan is relative to a nominal electronic surveillance scan angle off azimuth broadside by subtracting a mean azimuth scan offset and adding the nominal surveillance azimuth angle; and
   scaling the biased azimuth offset profile such that a maximum cumulative electronic offset is capped at a predetermined value.

10. The method of claim 9 further comprising mapping the scaled, biased azimuth offset profile into a function of mechanical broadside azimuth angle for use in a radar scheduler as the radar rotates.

11. The method of claim 8, wherein the providing dynamic electronic azimuth beam steering further comprises using a single template for all 360 degrees azimuth, the single template defining a first respective configuration for a first respective fan of search beams and comprising a first azimuth spacing of search beams, wherein the azimuth spacing increases and decreases proportional to a rate of forward and back scanning.

12. The method of claim 8, wherein the antenna array is configured to operate with a predetermined first scan using a first pre-set spacing between search beams and wherein providing dynamic electronic azimuth beam steering further comprises using, in the progressive forward scan, a second spacing that is a broader spacing than the first pre-set spacing and using, in the progressive backward scan, a third spacing that is a tighter spacing than used in the predetermined first scan, the tighter spacing having more beam overlap than exists in the predetermined first scan.

13. The method of claim 8, wherein the providing dynamic electronic azimuth beam steering further comprises dynamic scanning providing a substantially uniform target range performance in a presence of non-uniform loss, wherein at least a portion of the locally increased azimuth regions of loss are is compensated for by allocating additional power to at least some of the radar beams directed to the locally increased azimuth regions of loss, wherein this additional power is provided by decreasing power provided to radar beams directed the azimuth regions that do not have substantial loss.

14. The method of claim 8, wherein determining gain improvements further comprises using weather survey measurements to estimate environmental losses as a function of azimuth angles by using a dedicated weather survey dwell template to detect and categorize rain at each azimuth angle.

15. At least one non-transitory machine readable medium comprising instructions that, when executed by the machine, cause the machine to perform operations for:
   determining gain improvements needed to at least partially compensate for locally increased azimuth regions of loss in a search area scanned by a radar, wherein the gain improvements are based on a first amount of energy of a radar beam from the radar, the first amount of energy generated when the radar beam is used at a first set of different azimuth angles of a 360° mechanical rotation of the radar, without gain improvements, wherein the determined gain improvements are at least partially derived from information relating to locally increased azimuth regions of loss;

generating a gain profile based on the determined gain improvements to identify gain to be applied at one or more azimuth angles of the first set of different azimuth angles of the 360° mechanical rotation;

deriving an azimuth offset profile using the gain profile, wherein the azimuth offset profile defines:
- a first subset of azimuth angles associated with the locally increased azimuth regions of loss, the first subset comprising a first portion of the first set of different azimuth angles of the 360° mechanical rotation, where progressive scan back is used in at least a portion of the locally increased azimuth regions of loss to provide additional energy to the radar beam, beyond the first amount of energy, to compensate for at least a portion of the locally increased azimuth regions of loss; and
- a second subset of azimuth angles, corresponding to regions of low loss, the second subset comprising a second portion of the first set of different azimuth angles of the 360° mechanical rotation, where progressive scan forward is used in the regions of low loss, the progressive scan forward configured to provide less energy to the radar beam as compared with the first amount of energy providing dynamic electronic azimuth beam steering to vary a net azimuth beam scan rate, the dynamic electronic azimuth beam steering configured to:
- use multiple templates, the multiple templates comprising at least a first template and a second template, wherein the first template comprises a first respective spacing of search beams at a first energy level and the second template comprises a second respective spacing of search beams, the second respective spacing being a broader spacing than the first respective spacing;
- provide progressive scan back rotation at azimuths where extra dwell time is used as compared to a default dwell time for the radar, where the progressive scan back rotation uses a higher energy template having the first spacing but having a third energy level that is higher than the first energy level associated with the first spacing; and providing progressive scan forward where reduced dwell time, as compared to the default dwell time for the radar, is allowed, to maintain a substantially constant average target detection range as a function of azimuth in a presence of non-uniform loss associated at least with the locally increased regions of loss, the progressive forward scan using the second template.

\* \* \* \* \*